United States Patent
Nakajo

(10) Patent No.: US 7,364,250 B2
(45) Date of Patent: Apr. 29, 2008

(54) PRINTING METHOD, PRINTING SYSTEM, AND PRINT CONTROL APPARATUS

(75) Inventor: Naoki Nakajo, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 236 days.

(21) Appl. No.: 11/386,864

(22) Filed: Mar. 23, 2006

(65) Prior Publication Data

US 2007/0257947 A1    Nov. 8, 2007

(30) Foreign Application Priority Data

Mar. 23, 2005    (JP)    ............................. 2005-084137

(51) Int. Cl.
*B41J 29/38*    (2006.01)

(52) U.S. Cl. .......................................... 347/14; 347/41
(58) Field of Classification Search ................ 347/14, 347/15, 41
See application file for complete search history.

(56) References Cited

U.S. PATENT DOCUMENTS 7,121,639 B2 * 10/2006 Plunkett ...................... 347/13

FOREIGN PATENT DOCUMENTS

JP    11-268344 A    10/1999

* cited by examiner

*Primary Examiner*—Thinh Nguyen
(74) *Attorney, Agent, or Firm*—Sughrue Mion, PLLC

(57) ABSTRACT

A printing method includes: (A) creating print data by rearranging an order in which a plurality of pieces of pixel data which make up image data are arranged; and (B) based on the print data, alternately repeating a dot-forming process for forming, on a medium, a row of dots along a movement direction by ejecting ink from a plurality of nozzles which move in the movement direction and a carrying process for carrying the medium in a carrying direction with respect to the nozzles, to form, on the medium, a plurality of the rows of dots arranged in the carrying direction. In a case where lower-end printing for forming the rows of dots in a lower-end portion of the medium is to be performed after normal printing for forming the rows of dots in a central portion of the medium, positions, on the medium, of the rows of dots to be formed by the nozzles during each dot-forming process when the normal printing is continued without performing the lower-end printing are stored in a first table, positions, on the medium, of the rows of dots to be formed by the nozzles during a certain dot-forming process performing the lower-end printing are compared with the positions stored in the first table, and if there is any matching position as a result of the comparison, that position is stored in a second table, and the pixel data corresponding to the positions stored in the second table are extracted from the image data, to create the print data for performing the certain dot-forming process.

10 Claims, 36 Drawing Sheets

| virtual printing 1 |
|---|
| nozzle pitch k: 3 |
| carry amount F: 1 ( × D) |
| first nozzle: #1 |
| last nozzle: #5 |
| starting position Ls: 1 |
| finishing position Lf: 2 |

| virtual printing 2 |
|---|
| nozzle pitch k: 3 |
| carry amount F: 5 ( × D) |
| first nozzle: #1 |
| last nozzle: #5 |
| starting position Ls: 3 |
| finishing position Lf: 18 |

FIG. 11A

| position : 1 | position : 4 | position : 7 | position : 10 | position : 13 |
|---|---|---|---|---|
| nozzle number: 1 | nozzle number: 2 | nozzle number: 3 | nozzle number: 4 | nozzle number: 5 |

FIG. 11B

| position : 1 | position : 4 | position : 7 | position : 10 | position : 13 | position : 2 | position : 5 | position : 8 | position : 11 | position : 14 |
|---|---|---|---|---|---|---|---|---|---|
| nozzle number: 1 | nozzle number: 2 | nozzle number: 3 | nozzle number: 4 | nozzle number: 5 | nozzle number: 1 | nozzle number: 2 | nozzle number: 3 | nozzle number: 4 | nozzle number: 5 |

FIG. 11C

| position : 1 | position : 4 | position : 7 | position : 10 | position : 13 | position : 2 | position : 5 | position : 8 | position : 11 | position : 14 | position : 3 | position : 5 | position : 9 | position : 12 | position : 15 |
|---|---|---|---|---|---|---|---|---|---|---|---|---|---|---|
| nozzle number: 1 | nozzle number: 2 | nozzle number: 3 | nozzle number: 4 | nozzle number: 5 | nozzle number: 1 | nozzle number: 2 | nozzle number: 3 | nozzle number: 4 | nozzle number: 5 | nozzle number: 1 | nozzle number: 2 | nozzle number: 3 | nozzle number: 4 | nozzle number: 5 |

FIG. 11D

| position : 1 | position : 4 | position : 7 | position : 10 | position : 13 | position : 2 | position : 5 | position : 8 | position : 11 | position : 14 | position : 3 | position : 5 | position : 9 | position : 12 | position : 15 | position : 17 | position : 20 |
|---|---|---|---|---|---|---|---|---|---|---|---|---|---|---|---|---|
| nozzle number: 1 | nozzle number: 2 | nozzle number: 3 | nozzle number: 4 | nozzle number: 5 | nozzle number: 1 | nozzle number: 2 | nozzle number: 1 | nozzle number: 2 | nozzle number: 3 | nozzle number: 1 | nozzle number: 2 | nozzle number: 3 | nozzle number: 4 | nozzle number: 5 | nozzle number: 4 | nozzle number: 5 |

FIG. 11E

| position : 1 | position : 4 | position : 7 | position : 10 | position : 13 | position : 2 | position : 5 | position : 8 | position : 11 | position : 14 | position : 3 | position : 5 | position : 9 | position : 12 | position : 15 | position : 17 | position : 20 | position : 16 | position : 19 | position : 22 | position : 25 |
|---|---|---|---|---|---|---|---|---|---|---|---|---|---|---|---|---|---|---|---|---|
| nozzle number: 1 | nozzle number: 2 | nozzle number: 3 | nozzle number: 4 | nozzle number: 1 | nozzle number: 1 | nozzle number: 2 | nozzle number: 1 | nozzle number: 2 | nozzle number: 3 | nozzle number: 1 | nozzle number: 2 | nozzle number: 3 | nozzle number: 4 | nozzle number: 5 | nozzle number: 4 | nozzle number: 5 | nozzle number: 2 | nozzle number: 3 | nozzle number: 4 | nozzle number: 5 | virtual printing for upper-end printing

| |
|---|
| nozzle pitch k: 3 |
| carry amount F: 1 ( × D) |
| first nozzle: #1 |
| last nozzle: #5 |
| starting position Ls: 1 |
| finishing position Lf: 3 | virtual printing for normal printing

| |
|---|
| nozzle pitch k: 3 |
| carry amount F: 5 ( × D) |
| first nozzle: #1 |
| last nozzle: #5 |
| starting position Ls: 8 |
| finishing position Lf: 33 | virtual printing for lower-end printing

| |
|---|
| nozzle pitch k: 3 |
| carry amount F: 1 ( × D) |
| first nozzle: #1 |
| last nozzle: #5 |
| starting position Ls: 38 |
| finishing position Lf: 40 |

FIG. 13

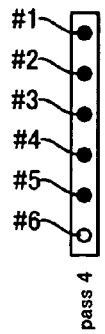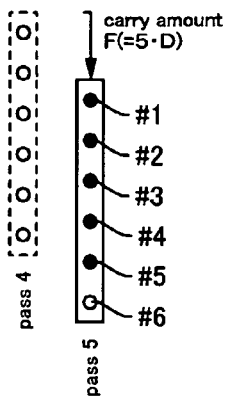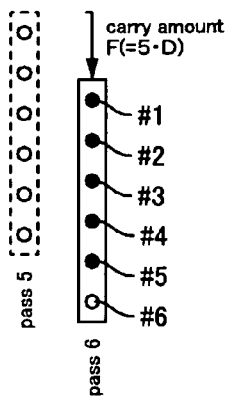

| scheduling table for pass 4 | scheduling table for pass 5 | scheduling table for pass 6 |
|---|---|---|
| position : 8<br>nozzle number: 1 | position : 13<br>nozzle number: 1 | position : 18<br>nozzle number: 1 |
| position : 11<br>nozzle number: 2 | position : 16<br>nozzle number: 2 | position : 21<br>nozzle number: 2 |
| position : 14<br>nozzle number: 3 | position : 19<br>nozzle number: 3 | position : 24<br>nozzle number: 3 |
| position : 17<br>nozzle number: 4 | position : 22<br>nozzle number: 4 | position : 27<br>nozzle number: 4 |
| position : 20<br>nozzle number: 5 | position : 25<br>nozzle number: 5 | position : 30<br>nozzle number: 5 |

FIG. 17A  FIG. 17B  FIG. 17C scheduling table for pass 10

| position : 38 nozzle number: 1 |
| position : 41 nozzle number: 2 |
| position : 44 nozzle number: 3 |
| position : 47 nozzle number: 4 |
| position : 50 nozzle number: 5 | scheduling table for pass 11

| position : 48 nozzle number: 4 |
| position : 51 nozzle number: 5 | scheduling table for pass 12

| position : 43 nozzle number: 2 |
| position : 46 nozzle number: 3 |
| position : 49 nozzle number: 4 |
| position : 52 nozzle number: 5 |

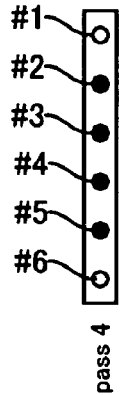

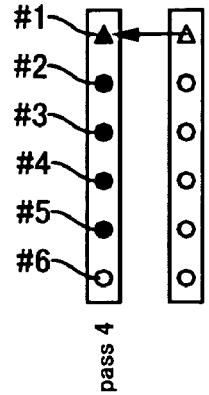

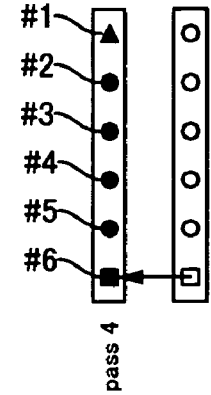

scheduling table for pass 4 scheduling table for pass 4 scheduling table for pass 4

|  |
|---|
| position : 11<br>nozzle number: 2 |
| position : 14<br>nozzle number: 3 |
| position : 17<br>nozzle number: 4 |
| position : 20<br>nozzle number: 5 |

|  |
|---|
| position : 8<br>nozzle number: 1<br>scan direction<br>    position: even |
| position : 11<br>nozzle number: 2 |
| position : 14<br>nozzle number: 3 |
| position : 17<br>nozzle number: 4 |
| position : 20<br>nozzle number: 5 |

|  |
|---|
| position : 8<br>nozzle number: 1<br>scan direction<br>    position: even |
| position : 11<br>nozzle number: 2 |
| position : 14<br>nozzle number: 3 |
| position : 17<br>nozzle number: 4 |
| position : 20<br>nozzle number: 5 |
| position : 23<br>nozzle number: 6<br>scan direction<br>    position: odd |

FIG. 32A      FIG. 32B      FIG. 32C

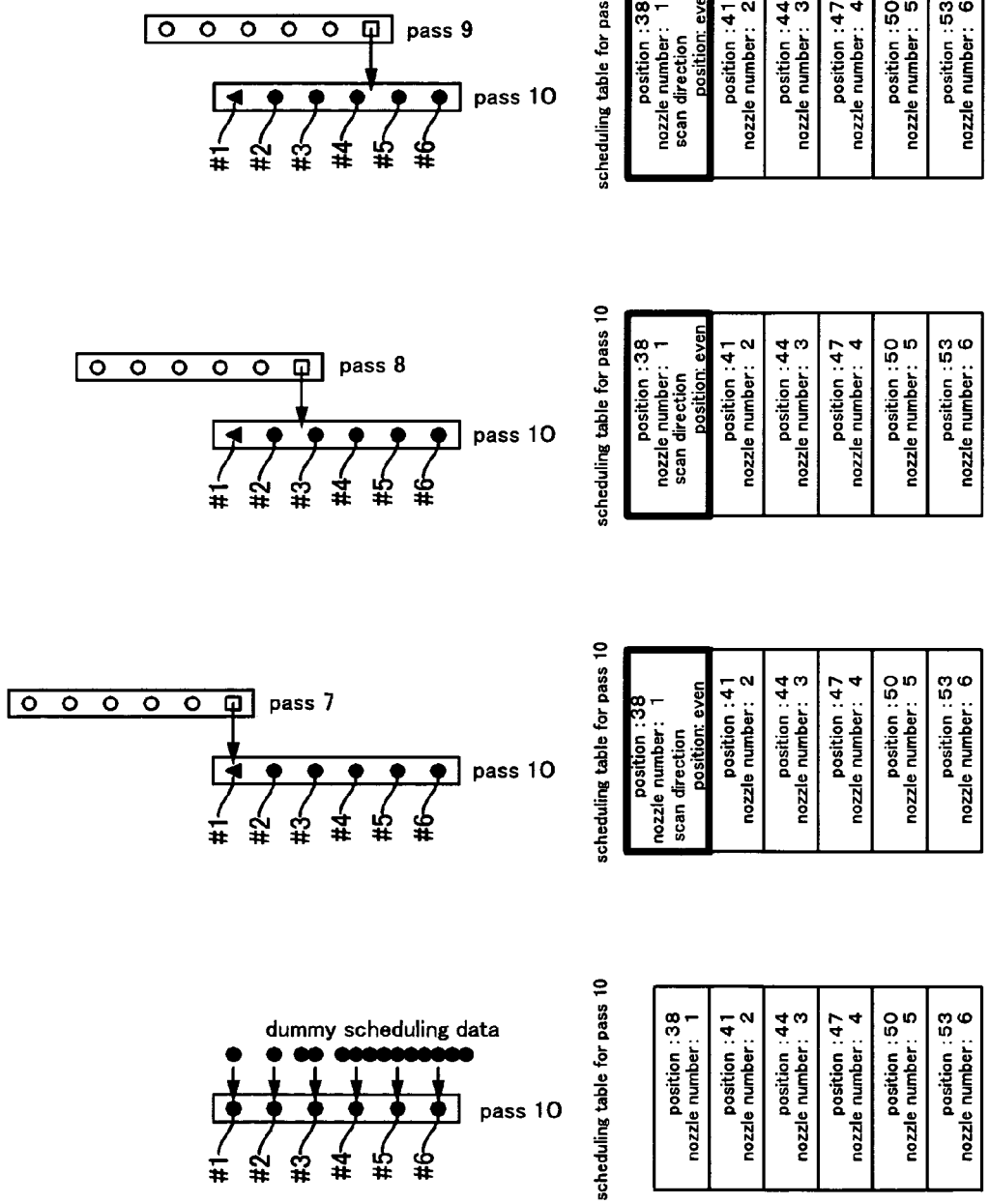

PRINTING METHOD, PRINTING SYSTEM, AND PRINT CONTROL APPARATUS

CROSS-REFERENCE TO RELATED APPLICATIONS

The present application claims priority upon Japanese Patent Application No. 2005-084137 filed on Mar. 23, 2005, which is herein incorporated by reference.

BACKGROUND

1. Technical Field

The present invention relates to printing methods, printing systems, and print control apparatuses.

2. Related Art

Inkjet printers which perform printing by ejecting ink onto media such as paper (including cloth, overhead projector sheets, and so on) are known. With such inkjet printers, an image made up of a plurality of rows of dots is printed by repeating a dot-forming process for forming rows of dots by ejecting ink from a plurality of nozzles which move in a movement direction and a carrying process for carrying paper in a carrying direction. (See, for example, JP-A-11-268344.)

When ink is ejected from the nozzles, if a row of dots is formed overlapping a position where a row of dots has already been formed, that row of dots will be formed darker compared to other rows of dots. Therefore, in a case where the position of a row of dots that can be formed during a certain dot-forming process is the same as the position of a row of dots that can be formed during another dot-forming process, it is necessary not to form the row of dots in one of the dot-forming processes.

However, the amount of data needed to be stored would be too large if print data were created after performing this kind of comparing process for all rows of dots.

SUMMARY

A primary aspect of the invention for resolving the above issues is a printing method including:

creating print data by rearranging an order in which a plurality of pieces of pixel data which make up image data are arranged; and based on the print data, alternately repeating a dot-forming process for forming, on a medium, a row of dots along a movement direction by ejecting ink from a plurality of nozzles which move in the movement direction and a carrying process for carrying the medium in a carrying direction with respect to the nozzles, to form, on the medium, a plurality of the rows of dots arranged in the carrying direction, wherein, in a case where lower-end printing for forming the rows of dots in a lower-end portion of the medium is to be performed after normal printing for forming the rows of dots in a central portion of the medium, positions, on the medium, of the rows of dots to be formed by the nozzles during each dot-forming process when the normal printing is continued without performing the lower-end printing are stored in a first table, positions, on the medium, of the rows of dots to be formed by the nozzles during a certain dot-forming process performing the lower-end printing are compared with the positions stored in the first table, and if there is any matching position as a result of the comparison, that position is stored in a second table, and the pixel data corresponding to the positions stored in the second table are extracted from the image data, to create the print data for performing the certain dot-forming process.

Other features of the present invention will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 7A and FIG. 7B are explanatory diagrams of interlaced printing, wherein FIG. 7A shows the positions of a head and how dots are formed in passes 1 to 5 and FIG. 7B shows the positions of the head and how dots are formed in passes 1 to 6;

FIG. 11A is an explanatory diagram of the scheduling table up until a first pass in "virtual printing 1", FIG. 11B is an explanatory diagram of the scheduling table up until a second pass in "virtual printing 1", FIG. 11C is an explanatory diagram of the scheduling table when performing the process in S109 for the first time with P=2, FIG. 11D is an explanatory diagram of the scheduling table up until the passes performed for the second time in "virtual printing 2", and FIG. 11E is an explanatory diagram of the scheduling table up until the passes performed for the third time in "virtual printing 2";

FIG. 13 is an explanatory diagram of parameters for setting conditions for virtual printing in a first embodiment;

FIG. 17A through FIG. 17C show, at the bottom thereof, scheduling tables for each of passes 4 through 6 and show, at the top thereof, conceptual diagrams of the content of processes when creating the scheduling tables;

FIG. 32A through FIG. 32C are explanatory diagrams of stages in the process for creating the scheduling table for pass 4;

FIG. 34A through FIG. 34D are explanatory diagrams of stages in the process for creating the scheduling table for pass 10;

DESCRIPTION OF EXEMPLARY EMBODIMENTS

Figure 1:
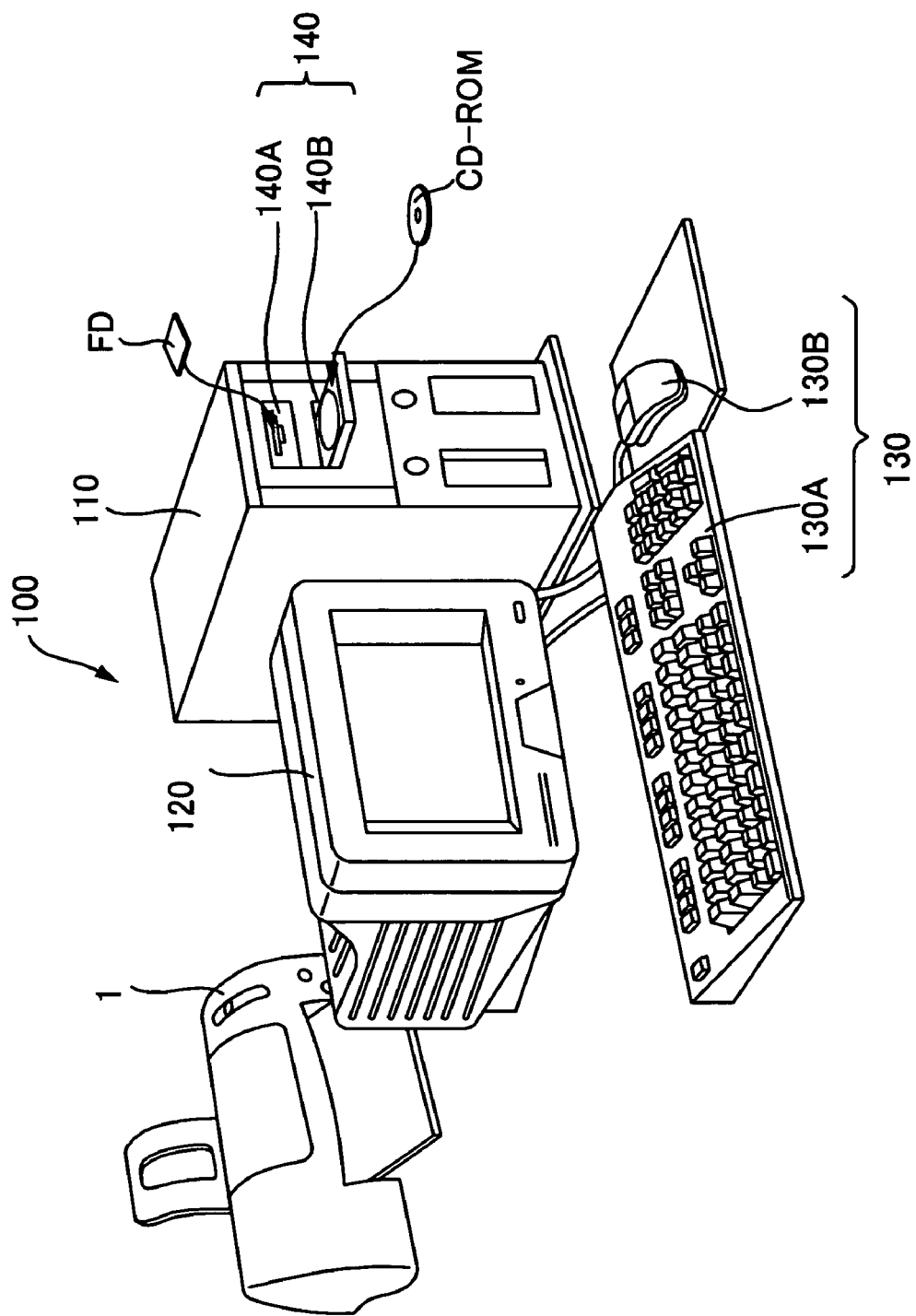
FIG. 1 is an explanatory diagram of an overall configuration of a printing system.

At least the following matters will be made clear by the explanation in the present specification and the description of the accompanying drawings.

A printing method includes:
creating print data by rearranging an order in which a plurality of pieces of pixel data which make up image data are arranged; and
based on the print data, alternately repeating
a dot-forming process for forming, on a medium, a row of dots along a movement direction by ejecting ink from a plurality of nozzles which move in the movement direction and
a carrying process for carrying the medium in a carrying direction with respect to the nozzles, to form, on the medium, a plurality of the rows of dots arranged in the carrying direction, wherein, in a case where lower-end printing for forming the rows of dots in a lower-end portion of the medium is to be performed after normal printing for forming the rows of dots in a central portion of the medium, positions, on the medium, of the rows of dots to be formed by the nozzles during each dot-forming process when the normal printing is continued without performing the lower-end printing are stored in a first table, positions, on the medium, of the rows of dots to be formed by the nozzles during a certain dot-forming process performing the lower-end printing are compared with the positions stored in the first table, and if there is any matching position as a result of the comparison, that position is stored in a second table, and the pixel data corresponding to the positions stored in the second table are extracted from the image data, to create the print data for performing the certain dot-forming process.

With this kind of printing method, the amount of data which needs to be stored can be reduced, since a table can be created for each dot-forming process.

In this printing method, it is preferable that a deleting process is performed in which positions, on the medium, of the rows of dots to be formed by the nozzles during the certain dot-forming process are compared with the positions stored in the first table, and if there is any matching position as a result of the comparison, that position is deleted from the first table, positions, on the medium, of the rows of dots to be formed by the nozzles during an other dot-forming process performed after the certain dot-forming process are compared with the positions stored in the first table after the deleting process, and if there is any matching position as a result of the comparison, that position is stored in the second table, and the pixel data corresponding to the positions stored in the second table are extracted from the image data, to create the print data for performing the other dot-forming process. In this way, it is possible to reduce the load on a print control apparatus.

In this printing method, it is preferable that print data for performing a dot-forming process which is to be performed after the certain dot-forming process is created while the certain dot-forming process is performed based on the print data. With this, the time until completion of printing is kept short.

In this printing method, it is preferable that, in a case where a certain nozzle forms dots at specific positions in the movement direction during a dot-forming process performing the normal printing and an other nozzle forms dots such as to fill in spaces between the dots formed at the specific positions during the lower-end printing, apposition, on the medium, of the row of dots to be formed by the certain nozzle during the dot-forming process performing the normal printing is compared with the positions stored in the second table, and if there is any matching position as a result of the comparison, information regarding the specific positions in the movement direction is associated with that position and stored in the second table in association therewith. In this way, dot rows can be prevented from being formed in an overlapped manner. Further, it is preferable that the certain nozzle is positioned at an end in the carrying direction of the plurality of nozzles. This is because nozzles positioned at end portions tend to eject ink defectively.

In this printing method, it is preferable that a computer having a printer driver installed thereon creates the print data. Note, however, that the print control apparatus and the printing apparatus may be provided as a single unit.

Further, a printing system includes:

a print control apparatus for creating print data by rearranging an order in which a plurality of pieces of pixel data which make up image data are arranged; and a printing apparatus that alternately repeats, based on the print data, a dot-forming process for forming, on a medium, a row of dots along a movement direction by ejecting ink from a plurality of nozzles which move in the movement direction and a carrying process for carrying the medium in a carrying direction with respect to the nozzles, to form, on the medium, a plurality of the rows of dots arranged in the carrying direction, wherein, in a case where the printing apparatus is to perform lower-end printing for forming the rows of dots in a lower-end portion of the medium after normal printing for forming the rows of dots in a central portion of the medium, the print control apparatus stores, in a first table, positions, on the medium, of the rows of dots to be formed by the nozzles during each dot-forming process when the normal printing is continued without performing the lower-end printing, compares positions, on the medium, of the rows of dots to be formed by the nozzles during a certain dot-forming process performing the lower-end printing with the positions stored in the first table, and if there is any matching position as a result of the comparison, stores that position in a second table, and extracts, from the image data, the pixel data corresponding to the positions stored in the second table, to create the print data for performing the certain dot-forming process.

With this kind of printing system, the amount of data which needs to be stored can be reduced, since a table can be created for each dot-forming process.

Further, provided is a print control apparatus provided with a driver for controlling a printing apparatus, the driver including:

a code for creating print data by rearranging an order in which a plurality of pieces of pixel data which make up image data are arranged;

a code for causing the printing apparatus to alternately repeat, based on the print data, a dot-forming process for forming, on a medium, a row of dots along a movement direction by ejecting ink from a plurality of nozzles which move in the movement direction and a carrying process for carrying the medium in a carrying direction with respect to the nozzles, to cause the printing apparatus to form, on the medium, a plurality of the rows of dots arranged in the carrying direction; and a code, for when causing the printing apparatus to perform lower-end printing for forming the rows of dots in a lower-end portion of the medium after normal printing for forming the rows of dots in a central portion of the medium, for storing, in a first table, positions, on the medium, of the rows of dots to be formed by the nozzles during each dot-forming process when the normal printing is continued without performing the lower-end printing, comparing positions, on the medium, of the rows of dots to be formed by the nozzles during a certain dot-forming process performing the lower-end printing with the positions stored in the first table, and if there is any matching position as a result of the comparison, storing that position in a second table, and extracting, from the image data, the pixel data corresponding to the positions stored in the second table, to create the print data for performing the certain dot-forming process.

With this kind of print control apparatus, the amount of data which needs to be stored can be reduced, since a table can be created for each dot-forming process.

Configuration of Printing System

An embodiment of a printing system (computer system) is described below with reference to the drawings. However, the description of the following embodiment also includes implementations relating to a computer program and a storage medium which stores the computer program, for example.

FIG. 1 is an explanatory diagram showing an external structure of a printing system. A printing system 100 is provided with a printer 1, a computer 110, a display device 120, an input device 130, and a record/play device 140. The printer 1 is a printing apparatus for printing images on a medium such as paper, cloth, or film. The computer 110 is communicably connected to the printer 1, and outputs print data corresponding to an image to be printed to the printer 1 in order to print the image with the printer 1. The display device 120 has a display, and displays user interfaces of programs such as an application program or a printer driver. The input device 130, which is for example a keyboard 130A and a mouse 130B, is used to input operations for the application program, settings of the printer driver, and the like. A flexible disk drive device 140A and/or a CD-ROM drive device 140B are employed as the record/play device 140.

A printer driver is installed on the computer 110. The printer driver is a program for making the display device 120 achieve functionality of displaying the user interface, and also for making the computer 110 achieve functionality of converting image data that has been output from the application program into print data. The printer driver is stored on a storage medium (a computer-readable storage medium) such as a flexible disk FD or a CD-ROM. Also, the printer driver can be downloaded onto the computer 110 via the Internet. It should be noted that this program is made up of codes for achieving the various functions.

Note also that "printing apparatus" means an apparatus for printing images on a medium, and, for example, the printer 1 can be taken as an example thereof. Furthermore, "print control apparatus" means an apparatus for controlling the printing apparatus, and, for example, a computer on which the printer driver is installed can be taken as an example thereof. Further, "printing system" means a system which contains at least the printing apparatus and the print control apparatus.

Printer Driver

<Regarding the Printer Driver>

Figure 2:
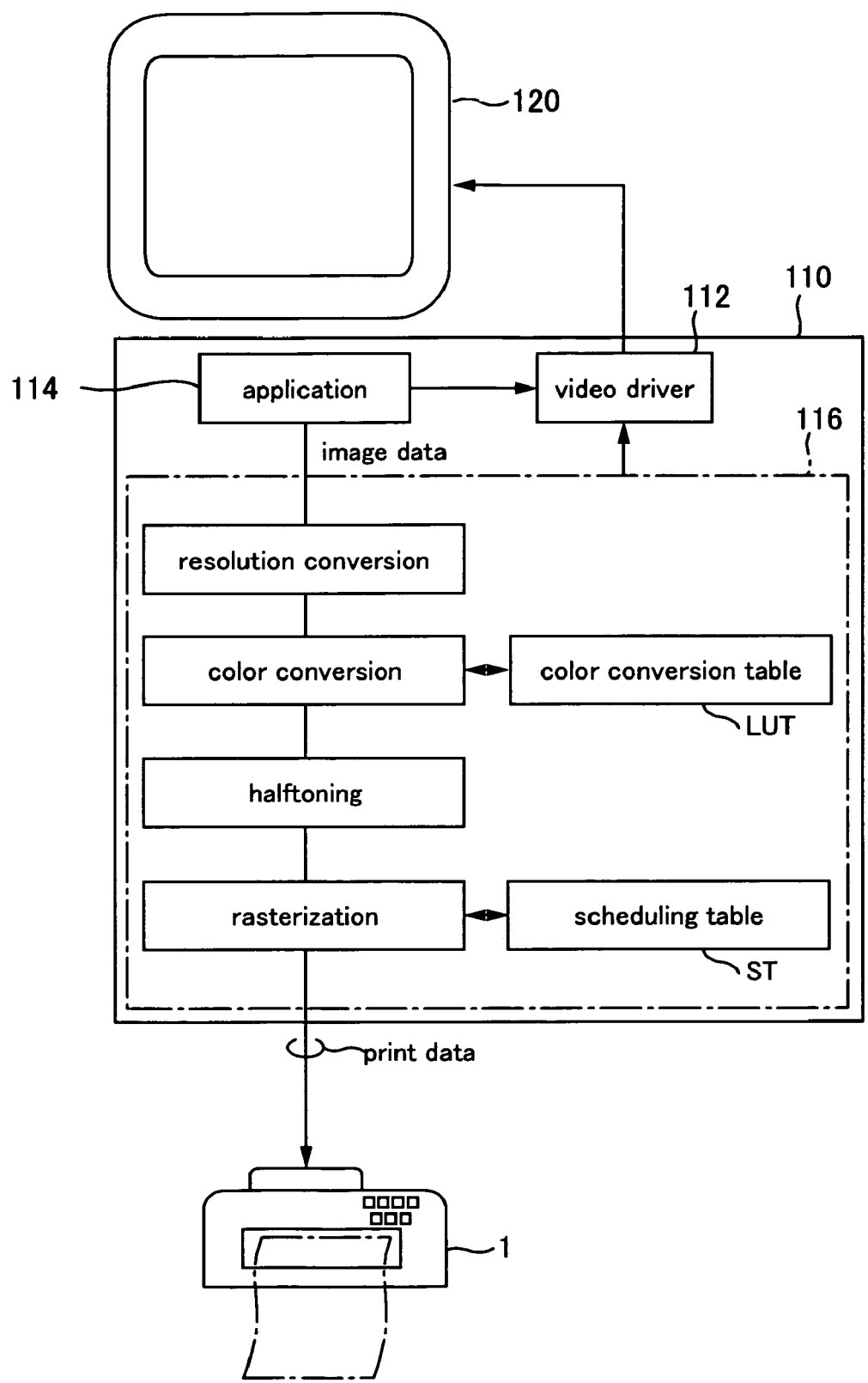
FIG. 2 is an explanatory diagram of processes performed by a printer driver.

FIG. 2 is a schematic explanatory diagram of basic processes carried out by the printer driver. Components that have already been described are assigned identical reference numerals and thus further description thereof is omitted.

On the computer 110, computer programs such as a video driver 112, an application program 114, and a printer driver 116 operate under an operating system installed on the computer. The video driver 112 has a function of displaying, for example, the user interface on the display device 120 in accordance with display commands from the application program 114 and/or the printer driver 116. The application program 114 has, for example, functions which enable image editing and creates data related to images (image data). A user can give an instruction to print an image edited in the application program 114 via the user interface of the application program 114. Upon receiving the print instruction, the application program 114 outputs the image data to the printer driver 116.

The printer driver 116 receives the image data from the application program 114, converts the image data to print data, and outputs the print data to the printer. Here, "print data" refers to data in a format which can be interpreted by the printer 1 and which includes a variety of command data and pixel data. Here, "command data" refers to data for instructing the printer to carry out specific operations. Furthermore, "pixel data" refers to data related to pixels that make up an image to be printed (a print image), and is, for example, data about a dot to be formed in a certain position on the paper corresponding to a certain pixel (data about dot color and size, for example).

In order to convert the image data that is output from the application program 114 to print data, the printer driver 116 carries out processes such as resolution conversion, color conversion, halftoning, and rasterization. The following is a description of processes carried out by the printer driver 116.

Resolution conversion is a process in which image data (i.e., text data, image data, etc.) output from the application program 114 is converted to a resolution for printing on paper. For example, when the resolution for printing an image on paper is specified as 720×720 dpi, then the image data received from the application program 114 is converted to image data with a resolution of 720×720 dpi. It should be noted that, after resolution conversion, the image data is multi-gradation RGB data (e.g., with 256 gradations) that is expressed using an RGB color space. Hereinafter, RGB data obtained by subjecting image data to resolution conversion is referred to as "RGB image data."

Color conversion is a process in which RGB data is converted to CMYK data that is expressed using a CMYK color space. It should be noted that CMYK data is data that corresponds to the colors of the ink of the printer. The color conversion processing is carried out by the printer driver 116 referencing a table (a color conversion look-up table LUT) in which gradation values of RGB image data are associated with gradation values of CMYK image data. Through this color conversion, RGB data of the pixels is converted to CMYK data that corresponds to ink colors. It should be noted that, after color conversion, the data is 256-gradation CMYK data expressed with a CMYK color space. Hereinafter, CMYK data obtained by subjecting RGB image data to color conversion is referred to as "CMYK image data."

Halftoning is a process through which data with a high number of gradations is converted to data of a number of gradations that can be formed by the printer. For example, through halftoning, data expressing 256 gradations is converted to 1-bit data expressing two gradations or 2-bit data expressing four gradations. Through halftoning, pixel data is created using dithering, gamma correction, error diffusion, and the like, such that the printer can form dots in a dispersed manner. During halftoning, the printer driver 116 references a dither table when performing dithering, a gamma table when performing gamma correction, and an error memory for storing diffused errors when performing error diffusion. Halftoned data has a resolution (for example, 720×720 dpi) identical to the above-mentioned RGB data. In this example, halftoned data is made up of 2 bits of data per pixel.

Rasterization is a process whereby image data which is made up of pixel data arranged in a matrix is rearranged into an order of data for transfer to the printer. Rasterized data is output to the printer as pixel data contained in print data. This rasterization process is performed by the printer driver 116 referencing the scheduling table. The scheduling table will be described further below.

Configuration of the Printer

<Regarding a Configuration of the Inkjet Printer>

Figure 3:
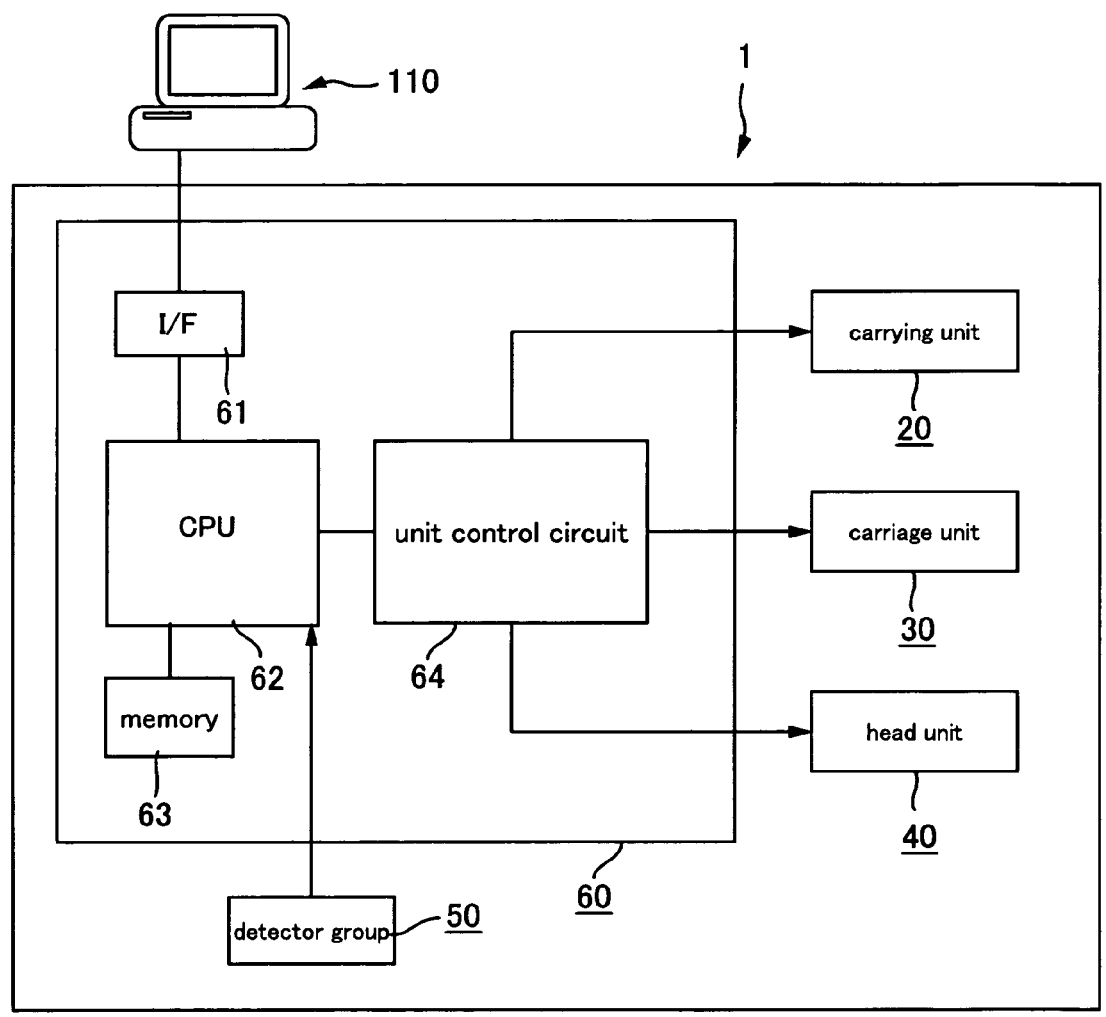
FIG. 3 is a block diagram of an overall configuration of a printer.
Figure 4A:
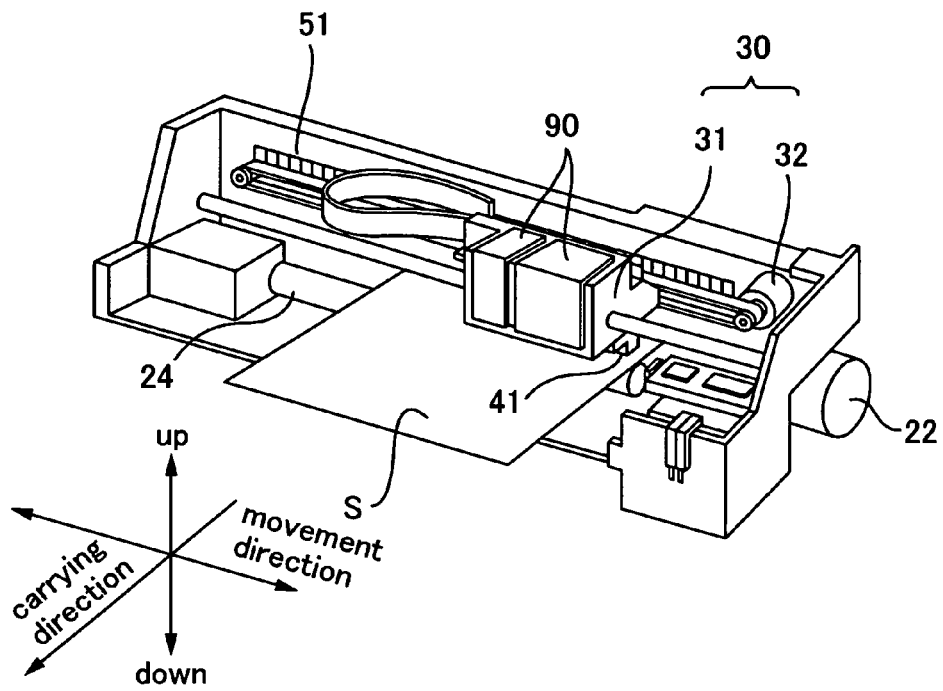
FIG. 4A is a schematic diagram of an overall configuration of the printer.
Figure 4B:
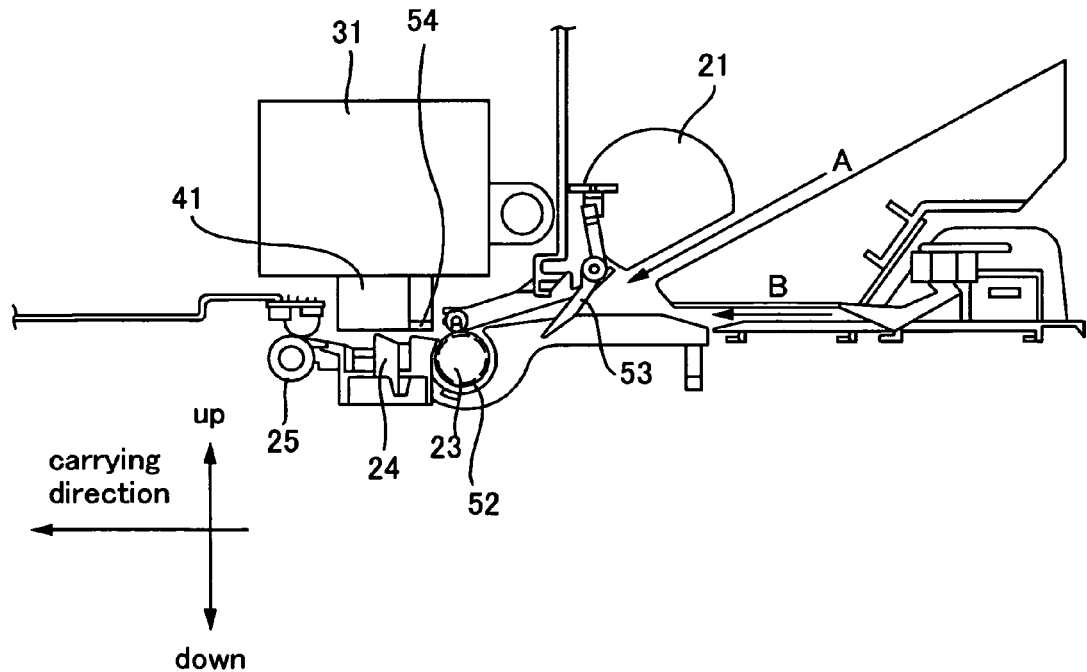
FIG. 4B is a transverse sectional view of an overall configuration of the printer.

FIG. 3 is a block diagram of an overall configuration of the printer 1 of the present embodiment. FIG. 4A is a schematic diagram of an overall configuration of the printer 1 of the present embodiment. FIG. 4B is transverse sectional view of an overall configuration of the printer 1 of the present embodiment. A basic configuration of the printer according to the present embodiment is described below.

The printer 1 according to the present embodiment includes a carrying unit 20, a carriage unit 30, a head unit 40, a detector group 50, and a controller 60. Having received print data from the computer 110, which is an external device, the printer 1 controls the various units (the carrying unit 20, the carriage unit 30, and the head unit 40) using the controller 60. The controller 60 controls the units in accordance with the print data that is received from the computer 110 to print an image on paper. The detector group 50 monitors the conditions within the printer 1, and outputs the results of this detection to the controller 60. The controller 60 controls each unit based on the detection results output by the detector group 50.

The carrying unit 20 is for feeding a medium (for example, paper S, etc.) into a printable position and carrying the paper in a predetermined direction (hereafter called a carrying direction) by a predetermined carry amount during printing. In other words, the carrying unit 20 functions as a carrying mechanism (a carrying means) for carrying paper. The carrying unit 20 is provided with a paper-supplying roller 21, a carrying motor 22 (hereafter also called a PF motor), a carrying roller 23, a platen 24, and a paper-discharge roller 25. Note, however, that the carrying unit 20 does not necessarily have to include all of these components in order to function as a carrying mechanism. The paper-supplying roller 21 is a roller for supplying, into the printer, paper that has been inserted into a paper insert opening. The paper-supplying roller 21 has a cross-sectional shape in the shape of the letter D, and the length of its circumference portion is set longer than the carrying distance to the carrying roller 23, so that the paper can be carried up to the carrying roller 23 using this circumference portion. The carrying motor 22 is a motor for carrying paper in the carrying direction, and is constituted by a DC motor, for example. The carrying roller 23 is a roller for carrying the paper S, which has been fed by the paper-supplying roller 21, up to a printable region, and is driven by the carrying motor 22. The platen 24 supports the paper S on which printing is being performed. The paper-discharge roller 25 is a roller for discharging the paper S to the outside, and is provided downstream in the carrying direction with respect to the printable region. The paper-discharge roller 25 rotates in synchronization with the carrying roller 23.

The carriage unit 30 is for causing the head to move (also referred to as "scan") in a predetermined direction (hereafter referred to as the "movement direction"). The carriage unit 30 has a carriage 31 and a carriage motor 32 (also called a "CR motor"). The carriage 31 can be moved back and forth in the movement direction. (The head is thus moved in the movement direction.) Furthermore, the carriage 31 detachably retains an ink cartridge containing ink. The carriage motor 32 is a motor for moving the carriage 31 in the movement direction, and is constituted by a DC motor, for example.

The head unit 40 is for ejecting ink onto paper. The head unit 40 has a head 41. The head 41 has a plurality of nozzles and ejects ink intermittently from each of the nozzles. The head 41 is provided to the carriage 31. Therefore, when the carriage 31 moves in the movement direction, the head 41 also moves in the movement direction. Dot lines (raster lines) are formed on the paper in the movement direction as a result of the head 41 intermittently ejecting ink while moving in the movement direction.

The detector group 50 includes a linear encoder 51, a rotary encoder 52, a paper detection sensor 53, an optical sensor 54, and so on. The linear encoder 51 is for detecting the position of the carriage 31 in the movement direction. The rotary encoder 52 is for detecting the amount of rotation of the carrying roller 23. The paper detection sensor 53 is for detecting the position of the front end of the paper to be printed. The paper detection sensor 53 is provided in a position where it can detect the position of the front end of the paper as the paper is being fed toward the carrying roller 23 by the paper-supplying roller 21. It should be noted that the paper detection sensor 53 is a mechanical sensor that detects the front end of the paper through a mechanical mechanism. More specifically, the paper detection sensor 53 has a lever that can be rotated in the carrying direction, and this lever is disposed such that it protrudes into the path over which the paper is carried. In this way, the front end of the paper comes into contact with the lever and the lever is rotated, and thus the paper detection sensor 53 detects the position of the front end of the paper by detecting the movement of the lever. The optical sensor 54 is attached to the carriage 31. The optical sensor 54 detects whether or not the paper is present by its light-receiving section detecting reflected light of the light that has been irradiated onto the paper from a light-emitting section. The optical sensor 54 detects the positions of the edges of the paper while being moved by the carriage 31, and in this way it can detect the width of the paper. The optical sensor 54 can also detect the front end (the downstream end in the carrying direction; also referred to as the upper end) and the bottom end (the upstream end in the carrying direction; also referred to as the lower end) of the paper according to the circumstances. The optical sensor 54 detects the ends of the paper optically, and thus has higher detection accuracy than the mechanical paper detection sensor 53.

The controller 60 is a control unit (controlling means) for carrying out control of the printer. The controller 60 has an interface section 61, a CPU 62, a memory 63, and a unit control circuit 64. The interface section 61 serves to exchange data between the computer 110, which is an external device, and the printer 1. The CPU 62 is a computational processing device for carrying out overall control of the printer. The memory 63 is for reserving a work area and an area for storing the programs for the CPU 62, for instance, and includes storing means such as a RAM or an EEPROM. The CPU 62 controls the various units via the unit control circuit 64 in accordance with programs stored in the memory 63.

<Regarding the Printing Operation>

Figure 5:
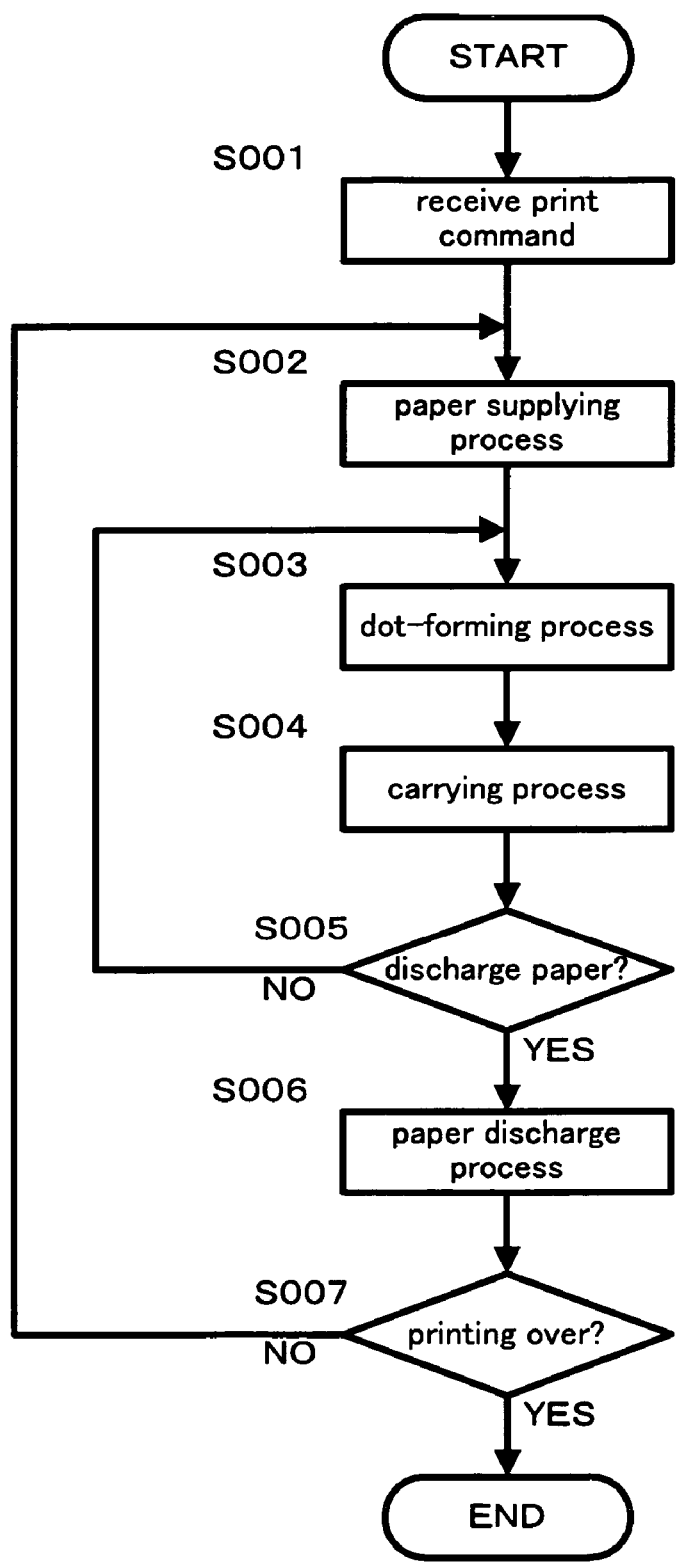
FIG. 5 is a flowchart showing processes during printing.

FIG. 5 is a flowchart of processes during printing. The processes described below are executed by the controller 60 controlling the various units in accordance with a program stored in the memory 63. This program includes codes for executing the various processes.

Receive Print Command (S001): First, the controller 60 receives a print command from the computer 110 via the interface section 61. This print command is included in the header of the print data transmitted from the computer 110. The controller 60 then analyzes the content of the various commands included in the print data that is received and uses the units to perform the following paper supplying process, carrying process, dot-forming process, and so on.

Paper Supplying Process (S002): The paper supplying process is a process for supplying paper to be printed into the printer and positioning the paper at a print start position (also referred to as the "indexed position"). The controller 60 rotates the paper-supplying roller 21 to feed the paper to be printed up to the carrying roller 23. Next, the controller 60 rotates the carrying roller 23 to position the paper, which has been fed from the paper-supplying roller 21, at the print start position. When the paper is positioned at the print start position, at least some of the nozzles of the head 41 are in opposition to the paper.

Dot-Forming Process (S003): The dot-forming process is a process for intermittently ejecting ink from the head that moves in the movement direction so as to form dots on the paper. The controller 60 drives the carriage motor 32 to move the carriage 31 in the movement direction. The controller 60 then causes the head to eject ink in accordance with the print data while the carriage 31 is moving. Dots are formed on the paper when ink droplets ejected from the head land on the paper. Since ink is intermittently ejected from the moving head, rows of dots (raster lines) made up of a plurality of dots arranged in the movement direction are formed on the paper.

Carrying Process (S004): The carrying process is a process for moving the paper relative to the head in the carrying direction. The controller 60 drives the carrying motor to rotate the carrying roller and thereby carry the paper in the carrying direction. Through this carrying process, the head 41 can form dots at positions that are different from the positions of the dots formed in the preceding dot-forming process.

Paper Discharge Determination (S005): The controller 60 determines whether or not to discharge the paper being printed. The paper is not discharged if there still is data to be printed on the paper being printed. The controller 60 alternately repeats the dot-forming process and the carrying process until there is no longer data to be printed, thereby gradually printing an image made of dots on the paper.

Paper Discharge Process (S006): When there is no longer data to be printed on the paper being printed, the controller 60 discharges the paper by rotating the paper-discharge roller. It should be noted that whether or not to discharge the paper can also be determined based on a paper discharge command included in the print data.

Printing Over Determination (S007): Next, the controller 60 determines whether or not to continue printing. If the next sheet of paper is to be printed, then printing is continued and the paper supplying process for the next sheet of paper is started. If the next sheet of paper is not to be printed, then the printing operation is ended.

<Regarding the Nozzles>

Figure 6:
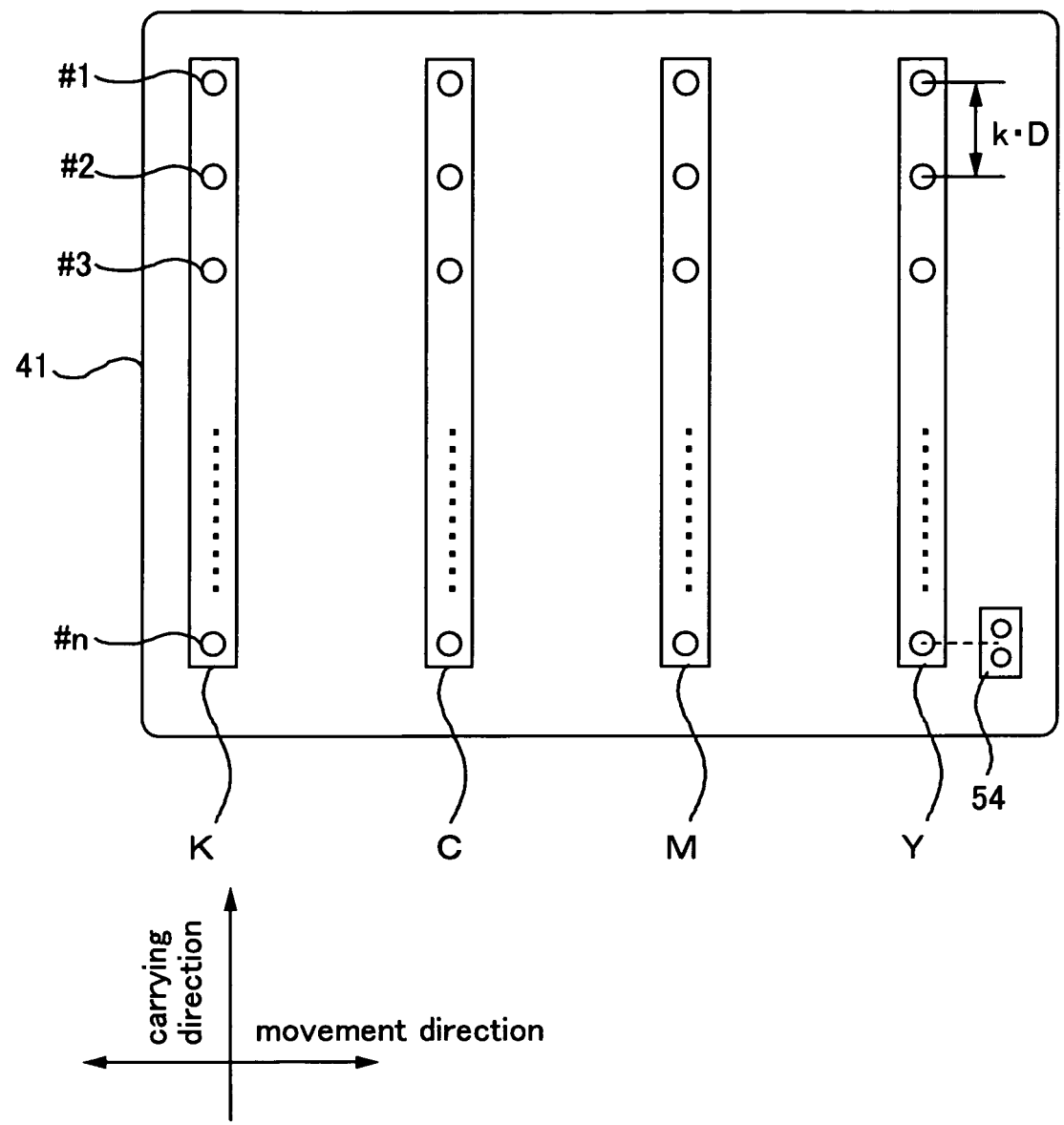
FIG. 6 is an explanatory diagram showing an arrangement of nozzles.

FIG. 6 is an explanatory diagram showing the arrangement of the nozzles in a lower face of the head 41. A black ink nozzle group K, a cyan ink nozzle group C, a magenta ink nozzle group M, and a yellow ink nozzle group Y are formed in the lower face of the head 41. Each nozzle group is provided with a plurality of nozzles (in this embodiment, 180 nozzles), which are ejection openings for ejecting inks of the respective colors.

The plurality of nozzles in each nozzle group are arranged in a row at a constant spacing (nozzle pitch:k·D) in the carrying direction. Here, D is the minimum dot pitch in the carrying direction (that is, the interval between dots formed on the paper S at the maximum resolution). Further, k is an integer of 1 or more. For example, if the nozzle pitch is 180 dpi (1/180 inch) and the dot pitch in the carrying direction is 540 dpi (1/540 inch), then k=3.

Each nozzle in the nozzle groups is assigned a number (#1 to #180) that becomes smaller the further downstream the nozzle is located. That is, a nozzle #1 is positioned more downstream in the carrying direction than a nozzle #180. Note also that the optical sensor 54 is provided in substantially the same position as the nozzle #180, which is on the furthest upstream side, with respect to its position in the paper carrying direction.

Each nozzle is provided with an ink chamber (not shown) and a piezo element. Driving the piezo element causes the ink chamber to contract and expand, thereby ejecting an ink droplet from the nozzle.

Printing Method of a First Embodiment

<Interlaced Printing (Normal Printing)>

Figure 7A:
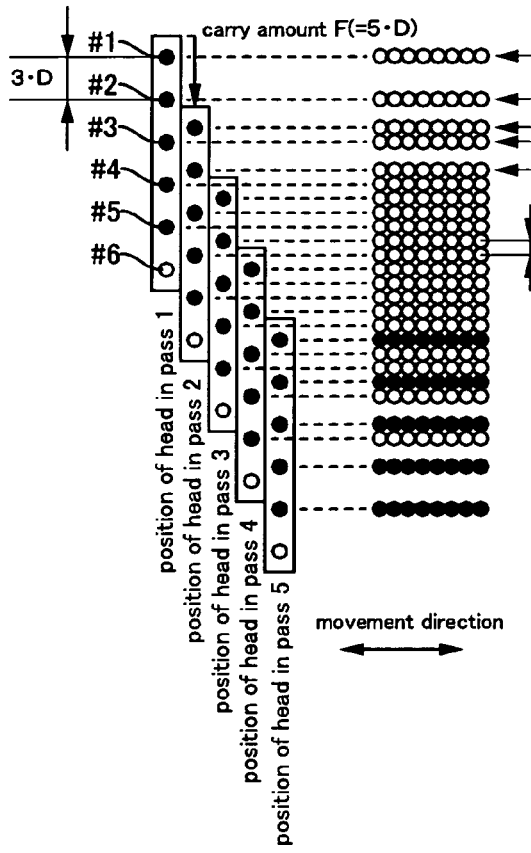
Figure 7B:
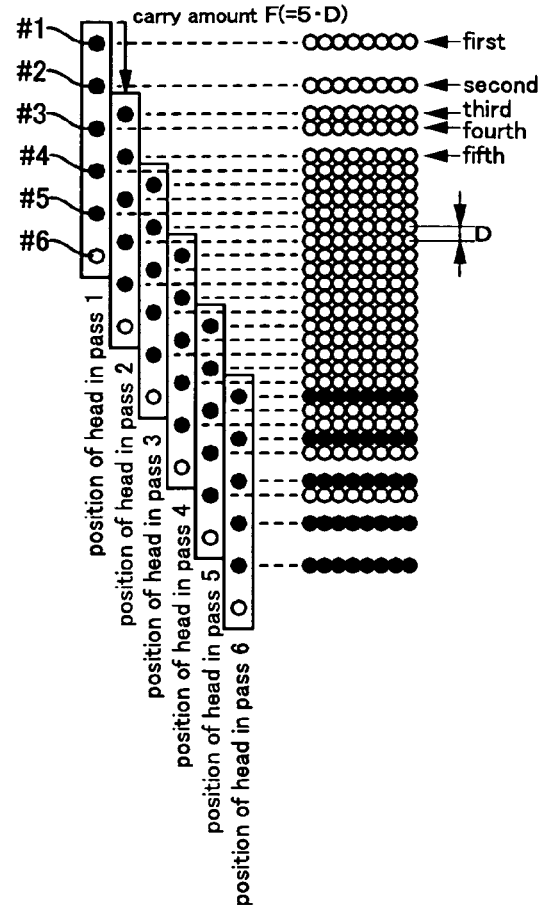

FIG. 7A and FIG. 7B are explanatory diagrams of interlaced printing. FIG. 7A shows the positions of the head (or nozzle group) and how dots are formed in passes 1 to 5. FIG. 7B shows the positions of the head and how dots are formed in passes 1 to 6.

To simplify the description, only one nozzle group of the plurality of nozzle groups is shown, and the number of nozzles in the nozzle group is reduced (to six nozzles in this case). In this diagram, nozzles indicated by black circles are nozzles allowed to eject ink, whereas nozzles indicated by white circles are nozzles not allowed to eject ink. It should be noted that, for convenience's sake, the head (and the nozzle group) is illustrated as if it is moving with respect to the paper, but the diagrams show the relative positional relationship of the head and the paper, and in fact it is the paper that is moving in the carrying direction. For the sake of description, each nozzle is shown as if it only forms a few dots (the circles in the drawings), but in actuality many dots are lined up in the movement direction because ink droplets are ejected intermittently from each nozzle moving in the movement direction. These rows of dots are also called "raster lines." Dots indicated by black circles are dots which are formed in the last pass, while dots which are indicated by white circles are dots formed in previous passes. Note that a "pass" is the process for forming dots by ejecting ink from moving nozzles (i.e., a dot-forming process). Each pass is performed in alternation with a process for carrying the paper in the carrying direction (i.e., a carrying process).

"Interlaced printing" refers to a printing method in which k is at least 2 and at least one raster line that is not recorded exists between the raster lines that are recorded in a single pass. For example, in the printing method shown in FIG. 7A and FIG. 7B, two raster lines exist between the raster lines formed in one pass.

With interlaced printing, every time the paper is carried in the carrying direction by a constant carry amount F, each nozzle records a raster line immediately above the raster line that was recorded in the immediately prior pass. The conditions for performing recording in this manner with a fixed carry amount are: (1) that the number of nozzles N (an integer) which are allowed to eject ink is coprime with k, and (2) that the carry amount F is set to N·D.

In the figure, the nozzle row has six nozzles arranged in the carrying direction. Since the nozzle pitch k of the nozzle row is three, only five nozzles (nozzle #1 through nozzle #5), and not all the nozzles, are used, in order to satisfy the interlaced printing condition that "N and k must be coprime." Furthermore, because five nozzles are used, the paper is carried using a carry amount of 5·D. As a result, using a nozzle row with a nozzle pitch of 180 dpi (3·D), for example, dots are formed on the paper with a dot spacing of 540 dpi (=D). (It should be noted that the number of nozzles in actuality is greater than six, so the number of nozzles N that are allowed to eject ink is greater, as is the carry amount F.)

The figures show a first raster line being formed by nozzle #1 in pass 1, a second raster line being formed by nozzle #2 in pass 1, a third raster line being formed by nozzle #1 in pass 2, and a fourth raster line being formed by nozzle #3 in pass 1. From the fifth raster line and on, raster lines are formed continuously in the carrying direction.

<Upper-end Printing and Lower-end Printing>

When interlaced printing is performed from the start as described above, some raster lines may, in some cases, not be formed continuously. For example, in FIG. 7A and FIG. 7B, the first, second, third, and fourth raster lines downstream in the carrying direction are not formed as raster lines which are continuous in the carrying direction. Accordingly, the printer forms raster lines continuous in the carrying direction by performing "upper-end printing," which is described below.

When interlaced printing is finished at the end, some raster lines may not be formed continuously. For example, in FIG. 7A and FIG. 7B, raster lines on the upstream side in the carrying direction are not formed as raster lines which are continuous in the carrying direction. Accordingly, the printer forms raster lines continuous in the carrying direction by performing "lower-end printing," which is described below, after performing interlaced printing.

Figure 8:
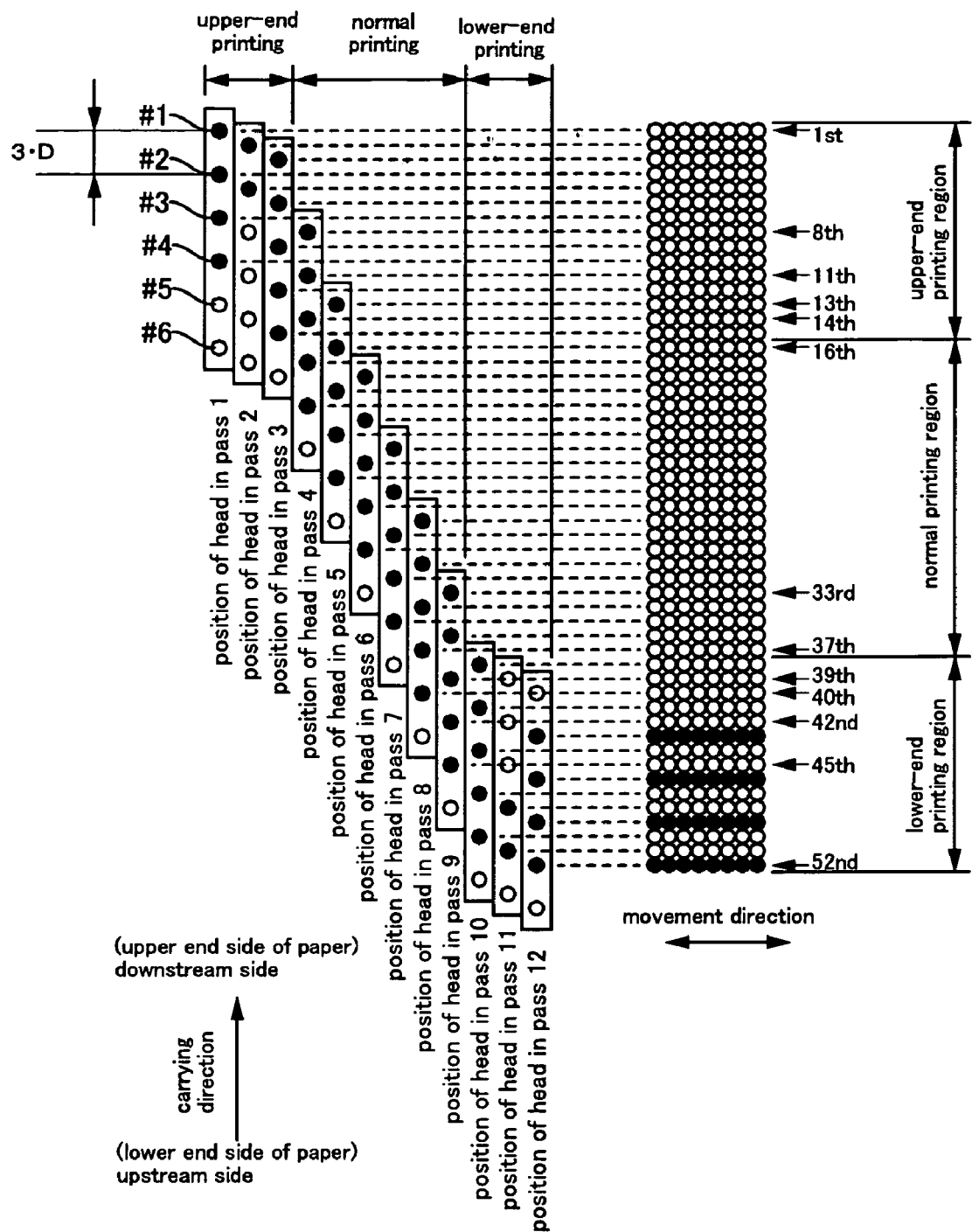
FIG. 8 is an explanatory diagram of upper-end printing and lower-end printing.

FIG. 8 is an explanatory diagram of upper-end printing and lower-end printing.

In FIG. 8, pass 1 through pass 3 correspond to upper-end printing, pass 4 through pass 9 correspond to normal printing (interlaced printing), and pass 10 through pass 12 correspond to lower-end printing. In upper-end printing, the carry amount during the carrying process between pass 1 and pass 2 and the carry amount during the carrying process between pass 2 and pass 3 are D. In lower-end printing, the carry amount during the carrying process between pass 10 and pass 11 and the carry amount during the carrying process between pass 11 and pass 12 are D.

By performing upper-end printing, it is possible to form raster lines which are continuous in the carrying direction from the first raster line. Further, by performing lower-end printing, it is possible to form raster lines which are continuous in the carrying direction up to the last raster line.

Note that the "upper-end printing region" in the drawing indicates the region from the raster line furthest downstream in the carrying direction to the raster line furthest upstream in the carrying direction of the raster lines formed by upper-end printing. The upper-end printing region here is the region from the first raster line to the fifteenth raster line. Furthermore, note that the "lower-end printing region" in the drawing indicates the region from the raster line furthest downstream in the carrying direction of the raster lines formed by lower-end printing to the raster line furthest upstream in the carrying direction. The lower-end printing region here is the region from the thirty-eighth raster line to the fifty-second raster line. The "normal printing region" in the drawing indicates the region between the upper-end printing region and the lower-end printing region. The normal printing region here is the region from the sixteenth raster line to the thirty-seventh raster line. All the raster lines in the normal printing region are formed through normal printing (normal interlaced printing). On the other hand, the upper-end printing region contains not only raster lines formed through upper-end printing, but also raster lines formed through normal printing. The lower-end printing region, too, contains not only raster lines formed through lower-end printing, but also raster lines formed through normal printing.

<Regarding Unused Nozzles>

Incidentally, despite the fact that the nozzle #1 through the nozzle #5 can eject ink in normal printing, the nozzle #5 is not allowed to eject ink during pass 1 in upper-end printing. If the thirteenth raster line were formed by ejecting ink from the nozzle #5 during pass 1, then the nozzle #1 would form the same raster line during pass 5, meaning that the thirteenth raster line would be formed overlapped and therefore become darker compared to other raster lines. It is possible to set the nozzle #1 during pass 5 as the unused nozzle, but in the present embodiment, the nozzle #1 during pass 5, in which normal interlaced printing is performed, is given priority, and the nozzle #5 during pass 1 is set as the unused nozzle. By giving priority to a nozzle during a pass when normal interlaced printing is performed, and not to a nozzle during a pass when upper-end printing is performed, the image quality of the print image improves, because there are more raster lines formed through normal interlaced printing.

Similarly, the nozzle #3 through the nozzle #5 during pass 2 are in a position at which the eighth, eleventh, and fourteenth raster lines can be formed, but they do not eject ink, because the same raster lines will be formed by the nozzle #1 through the nozzle #3 during pass 4. The same applies to lower-end printing, in which the nozzle #1 through the nozzle #3 during pass 11 and the nozzle #1 during pass 12 do not eject ink.

As described above, nozzles which should not eject ink appear when performing upper-end printing and lower-end printing. It is therefore necessary for the printer driver to select the unused nozzles.

First Reference Example

With the printing method of the first reference example, the printer driver first creates a scheduling table. The scheduling table is a table in which the positions of raster lines are associated with nozzles forming those raster lines. Based on the scheduling table, the printer driver performs rasterization and also determines which nozzles are to eject ink (and which nozzles are unused).

The printing method of the first reference example is described in order below. Note, however, that upper-end printing is described and a description of lower-end printing is omitted, in order to simplify the description.

<Regarding Creation of the Scheduling Table>

According to the first reference example, when creating the scheduling table, the printer driver virtually moves the head (a virtual head) with respect to the paper, just like during actual printing. The printer driver creates the scheduling table by associating the positions of the nozzles on the head with the positions of the raster lines.

Figures 9A, 9B:
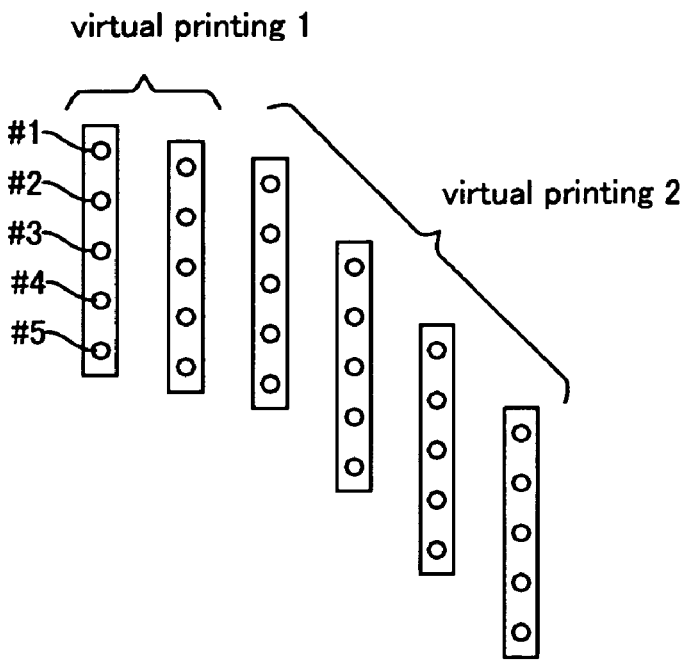
FIG. 9A is an explanatory diagram of virtual printing.
FIG. 9B is an explanatory diagram of parameters for setting conditions for virtual printing.

FIG. 9A is an explanatory diagram of virtual printing. FIG. 9B is an explanatory diagram of parameters for setting conditions for virtual printing. The parameters for this virtual printing are determined based on the printing mode and the paper size.

During "virtual printing 1", as in the actual upper-end printing, the head is virtually moved with respect to the paper. In other words, the nozzle pitch k of the head performing upper-end printing is 3. The carry amount F of the carrying process between pass 1 and pass 2 during "virtual printing 1" is 1·D. The first nozzle in the virtual head is #1, and the last nozzle is #5. Note that the printer driver does not take into consideration the presence of unused nozzles. A position Ls of the first nozzle (the nozzle #1) during the first pass (pass 1) during "virtual printing 1" is the same as the position in the carrying direction of the first raster line. A position Lf of the first nozzle (the nozzle #1) during the last pass (pass 2) during "virtual printing 1" is the same as the position in the carrying direction of the second raster line.

During "virtual printing 2", as in the actual interlaced printing, the head is virtually moved with respect to the paper. Unlike "virtual printing 1" described above, the carry amount F is 5·D. Further, a position Ls of the first nozzle (the nozzle #1) during the first pass (pass 3) in "virtual printing 2" is the same as the position in the carrying direction of the third raster line, and a position Lf of the first nozzle (the nozzle #1) during the last pass (pass 6) in "virtual printing 2" is the same as the position in the carrying direction of the eighteenth raster line.

Figure 10:
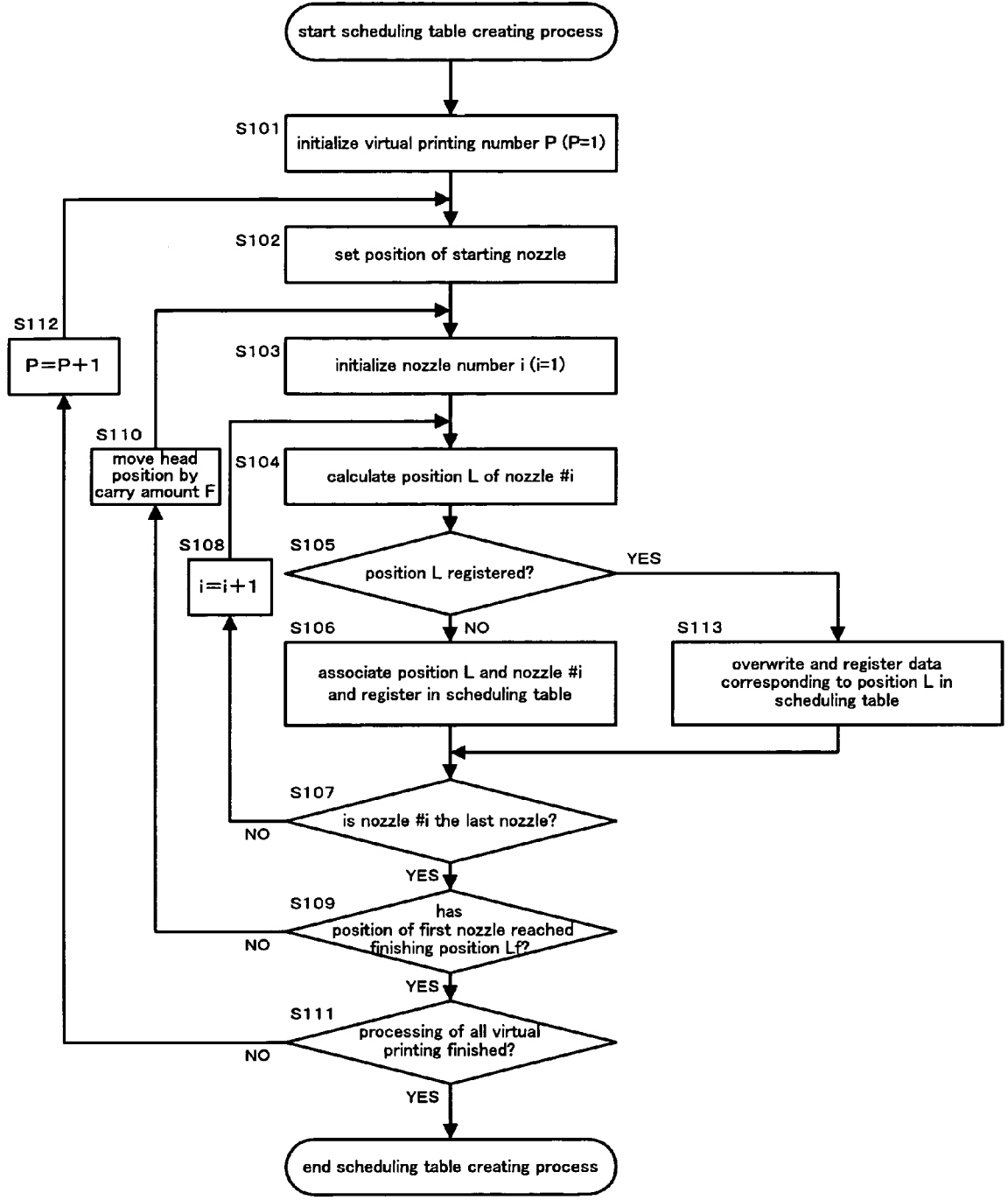
FIG. 10 is a flowchart showing creation of a scheduling table in a first reference example.

FIG. 10 is a flowchart showing creation of a scheduling table in the first reference example. FIG. 11A through FIG. 11E are explanatory diagrams of the scheduling table in the first reference example. The scheduling table is recorded in the memory on the computer. The printer driver executes a scheduling table creating process using the parameters for the virtual printing described above.

The printer driver first initializes a virtual printing number P (S101). The printer driver thereby reads from the memory the parameters which are set as the conditions of "virtual printing 1".

Next, the printer driver sets the position of a starting nozzle based on the parameters which have been read (S102). In the first reference example, the position of the nozzle #1 is set to "1" (specifically, the position of the first raster line in the carrying direction).

Next, the printer driver initializes a nozzle number i, and sets i=1 (S103).

Next, the printer driver calculates a position L of the nozzle #i (S104). The position of the nozzle #i is calculated from the nozzle pitch k, the carry amount F, the nozzle number i, the starting position Ls, and so on. At first, the position of the nozzle #1 is set to "1," which is the same as the starting position Ls.

Next, the printer driver determines whether or not the position "1" is already registered in the scheduling table (S105). At first, nothing is registered in the scheduling table, so the determination is "No."

Next, the printer driver associates the position "1" with the nozzle #1 and registers this to the scheduling table (S106).

The printer driver determines whether or not the nozzle #i is the last nozzle (S107). The information on the last nozzle is set in the parameters of the virtual printing described above. Here, the nozzle #1 is not the last nozzle, so this determination is "No."

The printer driver increments the nozzle number i in order to perform the process for the next nozzle (S108). Here, the nozzle number is incremented from 1 to 2.

The printer driver repeats the processes in S104 through S107 above and creates the scheduling table in which the position L and the nozzle number are associated for the nozzle #2 through the nozzle #5.

FIG. 11A is an explanatory diagram of the scheduling table created by the printer driver up until this point. At this point, each nozzle is associated with the position of each nozzle for the virtual pass 1 in the scheduling table.

The processes in S104 through S107 are repeated until the last nozzle is reached (the nozzle #5), and when the answer is "Yes" for S107, the printer driver determines whether or not the first nozzle (#1) has reached the finishing position Lf. At first, the position of the nozzle #1 is set to "1," which is the same as the starting position Ls, so the answer is "No."

Next, the printer driver sets the position of the first nozzle to a position equal to the current position plus the carry amount F. By doing this, the position of the head moves by the carry amount F virtually with respect to the paper. At first, through this process, the position of the first nozzle moves from a position "1" to a position "2." The creation of the scheduling table for the virtual pass 1 is thereby finished, and the creation of the scheduling table for the virtual pass 2 begins.

The printer driver initializes the nozzle number i (S103), repeats the processes in S104 through S107 above, and creates the scheduling table in which the position L and the nozzle number are associated for the nozzle #1 through the nozzle #5.

FIG. 11B is an explanatory diagram of the scheduling table created by the printer driver up until this point. At this point, each nozzle is associated with the position of each nozzle for the virtual pass 1 and the virtual pass 2 in the scheduling table.

After the creation of the scheduling table for the virtual pass 2 is finished, the printer driver determines whether or not the first nozzle (#1) has reached the finishing position Lf. At this point, the nozzle #1, which is the first nozzle, has reached the finishing position "1," so the answer is "Yes."

The printer driver increments the virtual printing number P in order to perform the processes for the next virtual printing (S112). Here, the virtual printing number is incremented from 1 to 2. The printer driver then reads from the memory the parameters set as conditions for "virtual printing 2", and, as in the case of "virtual printing 1" described above, registers the relationships between the nozzle positions and the nozzle numbers in the scheduling table. FIG. 11C is an explanatory diagram of the scheduling table when the positions L and nozzle numbers are associated and registered, for the nozzles #1 through #5 for a first pass of "virtual printing 2". (In other words, FIG. 11C is an explanatory diagram of the scheduling table when performing S109 for the first time when P=2.)

When the head position is virtually moved once by the carry amount F during "virtual printing 2", the position of the nozzle #1 becomes "8" (S104).

Note, however, that information associating the position 8 and the nozzle number 3 has already been stored in the scheduling table. The printer driver therefore answers "Yes" in S105. The printer driver then overwrites the nozzle number 3 which corresponds to the position 8 and registers the nozzle number 1 in the scheduling table. In other words, by performing this overwriting, the information associating the position 8 with the nozzle number 3 (see FIG. 11B) which was registered during the processes for "virtual printing 1" is deleted from the scheduling table, and in its place, information associating the position 8 with the nozzle number 1 is registered in the scheduling table.

Similarly, information associating the position 11 with the nozzle number 4 has already been stored in the scheduling table during the processes for "virtual printing 1". This information is overwritten with information associating the position 11 with the nozzle number 2 in the processes for "virtual printing 2". Furthermore, information associating the position 14 with the nozzle number 5 has already been stored in the scheduling table during the processes for "virtual printing 1". This information is overwritten with information associating the position 14 with the nozzle number 3 in the processes for "virtual printing 2".

A position 17 of the nozzle #4 has not yet been registered at this time. Similarly, a position 20 of the nozzle #5 has not yet been registered at this time. The answer at S105 is therefore "No," and information associating these positions and nozzles is added to the scheduling table.

FIG. 11D is an explanatory diagram of the scheduling table when the positions L and the nozzle numbers are associated and registered for the nozzle #1 through the nozzle #5 for the second pass of "virtual printing 2". In FIG. 11D, the information in bold outline is information which has been registered by overwriting.

Next, the printer driver sets the position of the first nozzle to a position equal to the current position plus the carry amount F, and performs processes for the third pass of "virtual printing 2". At this point, the position of the nozzle #1 is 13. Information associating the position 13 and the nozzle number 5 has already been stored in the scheduling table. The printer driver therefore overwrites the nozzle number 1 and registers the nozzle number 5 which corresponds to the position 13 in the scheduling table.

FIG. 11E is an explanatory diagram of the scheduling table when the positions L and the nozzle numbers are associated and registered for the nozzles #1 through #5 for the third pass of "virtual printing 2". In FIG. 11E, the information in bold outline is information which has been registered by overwriting.

The printer driver repeats the above processes until the processes for all the virtual heads finish. In the first reference example, the answer at S109 is "Yes" because the position of the nozzle #1 has attained the finishing position 18(=Lf) after the processes (S104 through S107) related to the fourth pass of "virtual printing 2" are finished. Furthermore, in the first reference example, the answer at S111 is "Yes" because the processes for all virtual printing are finished after the processes for the fourth pass of "virtual printing 2" are finished, and therefore the printer driver finishes the process of creating the scheduling table.

<Regarding How to Use the Scheduling Table>

Figure 12:
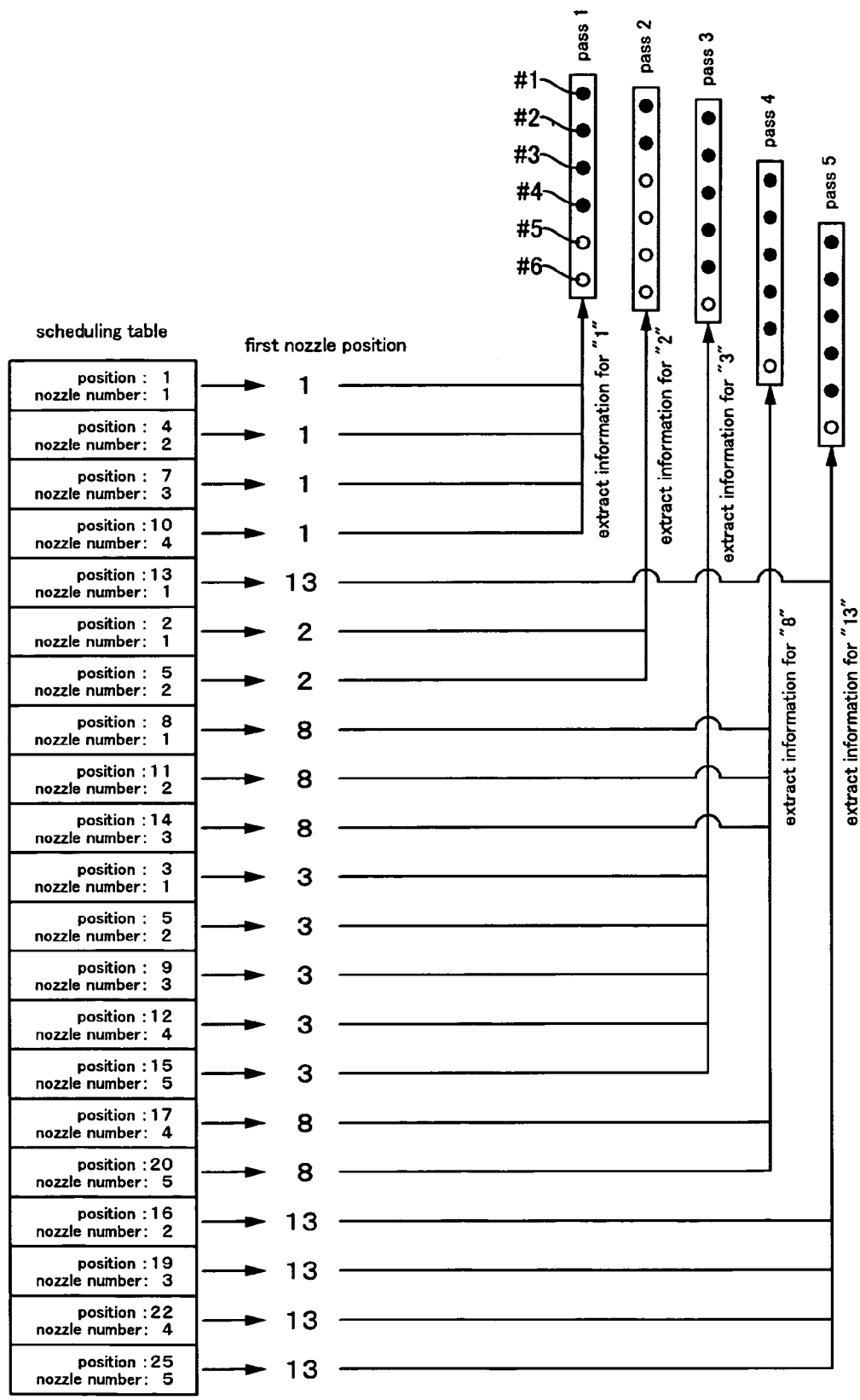
FIG. 12 is an explanatory diagram showing how to use the scheduling table in a first reference example.

FIG. 12 is an explanatory diagram showing how to use the scheduling table of the first reference example. Information associating positions of raster lines with numbers of nozzles which form those raster lines is stored in the scheduling table.

The printer driver first calculates the position of the first nozzle based on the position of the raster lines and the nozzle numbers for each piece of information in the scheduling table. If the position of the raster line is X and the nozzle number is Y, the position of the first nozzle is X−(Y−1)×k. For example, if the position of the raster line is 7 and the nozzle number is 3, the first nozzle is "1(=7−(3−1)×3)".

Next, the printer driver extracts, from the information in the scheduling table, the information in which the position of the first nozzle is the same. For example, four pieces of information are extracted from the scheduling table as information in which the position of the first nozzle is 1.

The reason that there are only four, and not five, pieces of information in which the position of the first nozzle is 1 in the scheduling table is because, as shown in FIG. 11E, the nozzle number 5, corresponding to the position 13 in the scheduling table, was overwritten by the nozzle number 1. Similarly, the reason there are only two pieces of information in which the position of the first nozzle is 2 in the scheduling table is because, as shown in FIG. 11D, three pieces of information were overwritten.

The printer driver performs rasterization such that image data of raster lines corresponding to each nozzle are allocated based on the extracted information. For example, in pass 1, image data corresponding to a first raster line is allocated to the nozzle #1, image data corresponding to a fourth raster line is allocated to the nozzle #2, image data corresponding to a seventh raster line is allocated to the nozzle #3, and image data corresponding to a tenth raster line is allocated to the nozzle #4.

However, there are only four pieces of information in the scheduling table in which the position of the first nozzle is 1, and there is no information in the scheduling table related to the position of raster lines which correspond to the nozzle #5 and the nozzle #6 in pass 1. In this case, the printer driver allocates NULL data to the nozzle #5 and the nozzle #6 as image data.

When the printer driver sends to the printer print data for pass 1 generated in this manner, the printer forms four raster lines on the paper by ejecting ink from the nozzle #1 through the nozzle #4 in pass 1 and not ejecting ink from the nozzle #5 and the nozzle #6. In other words, in the first reference example, the printer driver allocates NULL data to the nozzle #5 and the nozzle #6 in pass 1, thereby making the nozzle #5 and the nozzle #6 the unused nozzles.

Similarly, when the printer driver extracts information in which the position of the first nozzle is 2 and performs rasterization based on the extracted information, the printer forms two lines on the paper in pass 2 by ejecting ink from the nozzle #1 and the nozzle #2 and not ejecting ink from the nozzle #3 through the nozzle #6. In other words, in the first reference example, the printer driver allocates NULL data to the nozzle #3 through the nozzle #6 in pass 2, thereby making the nozzle #3 through the nozzle #6 the unused nozzles.

<Problems in the First Reference Example>

With the first reference example, it is necessary to create a scheduling table which corresponds to all raster lines before printing. A storage area for storing the scheduling table must therefore be set aside. In FIG. 8, the total number of raster lines is only 52, but the actual number of nozzles is 180, so the amount of data for the scheduling table for all the raster lines is extremely large in cases in which there are several thousand raster lines in the normal printing region.

Furthermore, the process of extracting only that data needed, as shown in FIG. 12, from among this extremely large amount of data takes a long time. Also, print data cannot be created until the scheduling table is complete, delaying the start of printing.

Accordingly, in the present embodiment, a scheduling table is created and unused nozzles are determined pass by pass, as described below.

First Embodiment

FIG. 13 is an explanatory diagram of parameters for setting conditions for virtual printing in a first embodiment. These parameters for the virtual printing are determined based on the printing mode and the paper size.

In the present embodiment, when associating the nozzles in a certain pass with the positions of the raster lines which those nozzles will form, the printer driver compares the positions of each nozzle in that pass with the positions of nozzles in other passes. Then, based on the results of the comparison, the printer driver creates the scheduling table for that pass.

Since scheduling tables are created in sequence for each pass, the scheduling tables for passes during upper-end printing are created before scheduling tables for passes during normal printing. Below follows a description in order of the creation of a scheduling table.

<Regarding Creation of Scheduling Tables for Upper-end Printing>

Figure 14:
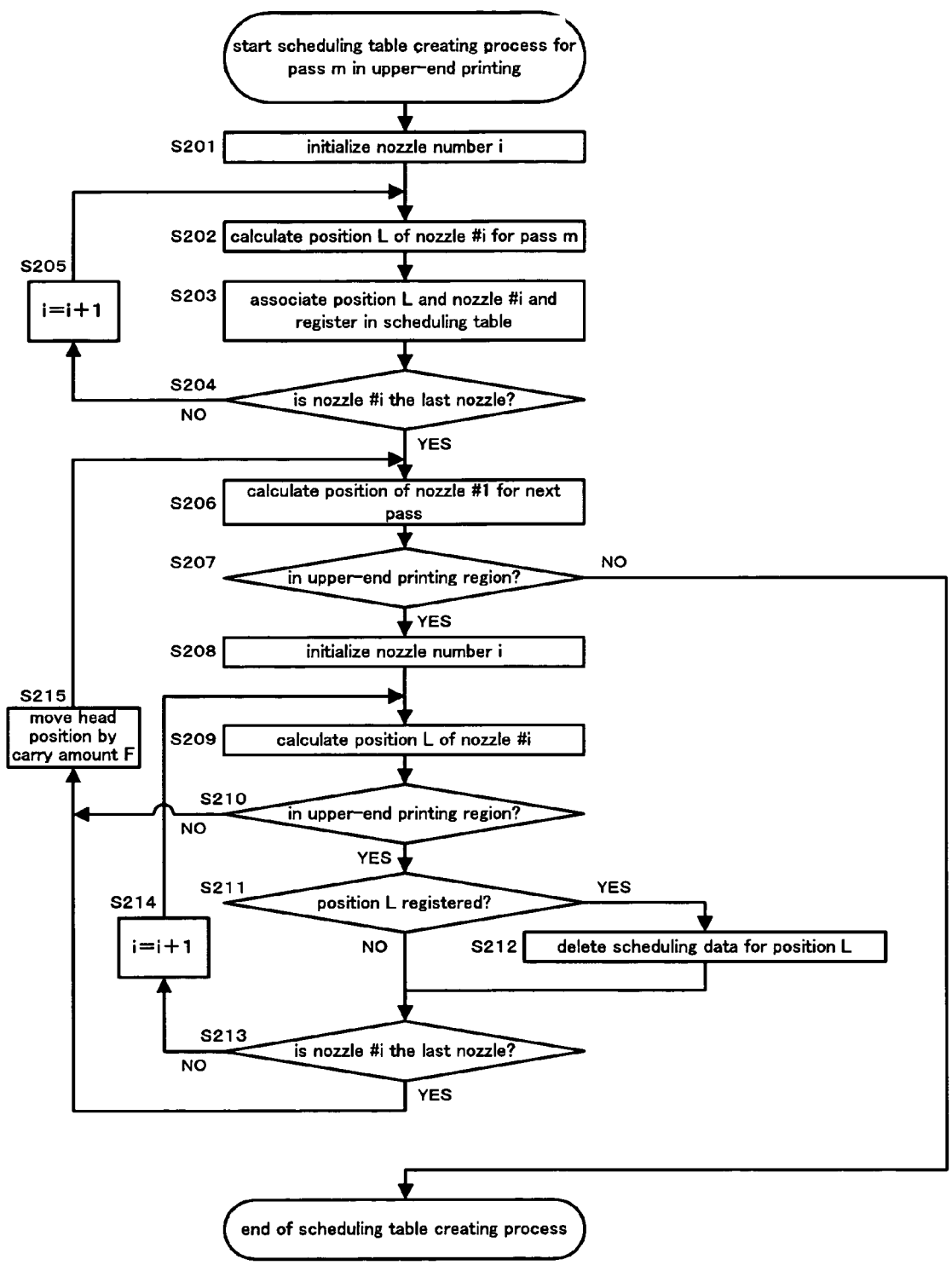
FIG. 14 is a flowchart showing a process for creating the scheduling table for pass m in upper-end printing according to the first embodiment.

FIG. 14 is a flowchart showing a process for creating the scheduling table for pass m during upper-end printing according to the first embodiment. The printer driver executes these processes by using the hardware resources of the computer according to a program stored in the memory. FIG. 15A through FIG. 15E are explanatory diagrams of stages in the process for creating the scheduling table for pass 1. At the bottom of each drawing is shown the scheduling table being created, while at the top of each drawing conceptual diagrams of the content of processes during creation of scheduling tables are shown. The scheduling table is recorded in the memory on the computer. The printer driver creates the scheduling table using the virtual printing parameters for upper-end printing and the virtual printing parameters for normal printing.

The printer driver initializes the nozzle number i, and sets i=1 (the number of the first nozzle in the virtual printing parameters for upper-end printing) (S201). The printer driver then calculates a position L for the nozzle #1 during pass m (pass 1 being the first) (S202). The position L of the nozzle #i is calculated from the virtual printing parameters for upper-end printing (i.e., the nozzle pitch k, the carry amount F, the starting position Ls), the nozzle number i, the pass number m, and so on. The position of the nozzle #1 during pass 1 is the starting position Ls. The printer driver then associates the position L with the nozzle #i, and registers this in the scheduling table (S203). The last nozzle is #5, so the printer driver repeats the above processes until i=5 (S201 through S205).

Figure 15:
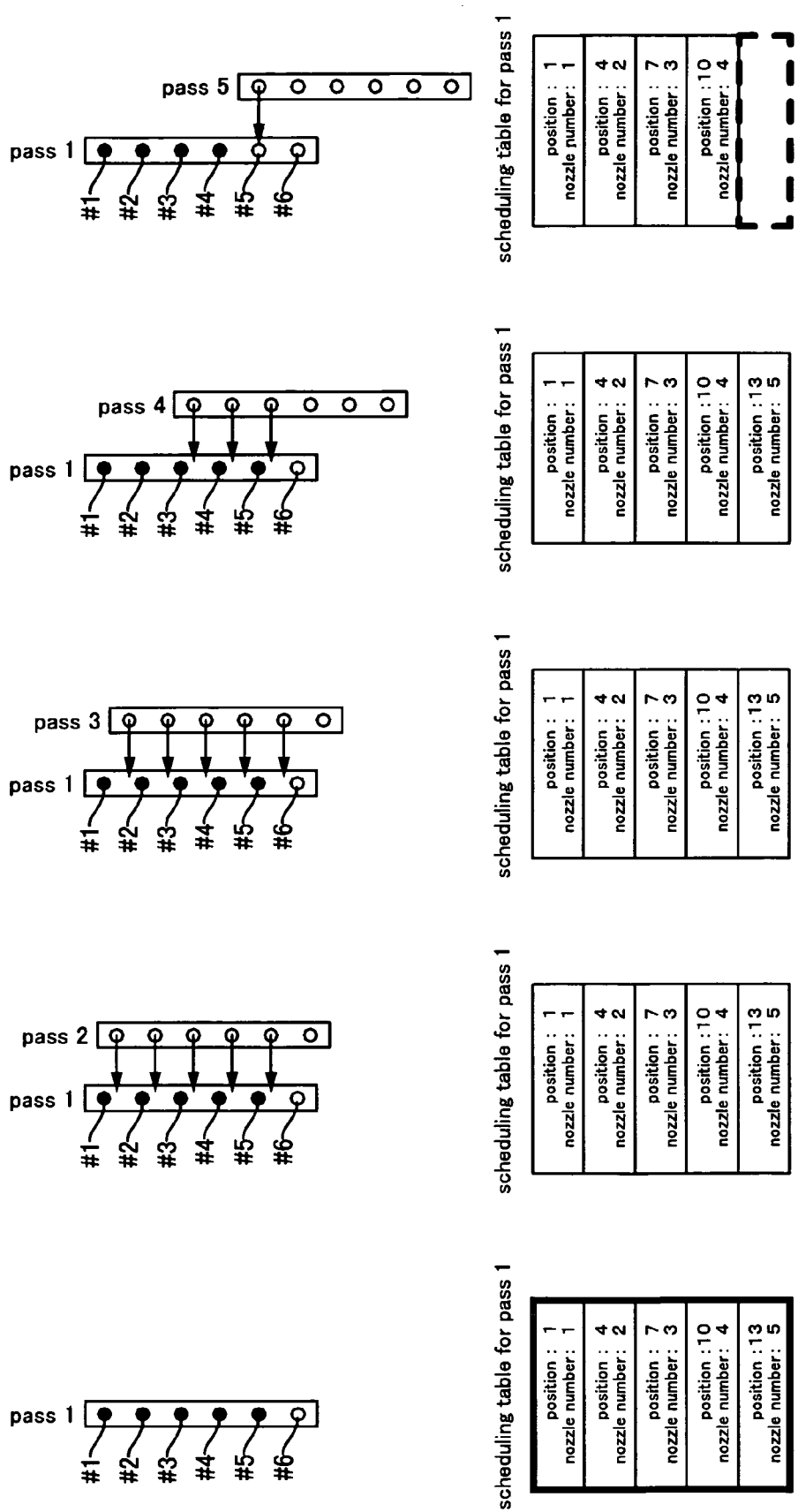
FIG. 15A through FIG. 15E are explanatory diagrams of stages in the process for creating the scheduling table for pass 1.

In other words, a scheduling table is created in which the positions of the nozzles and the nozzle numbers are associated for pass m, through the processes of step S201 through step S205. During the creation of the scheduling table for pass 1, FIG. 15A shows the scheduling table at the point at which the answer at step S204 is "Yes."

Next, the printer driver calculates the position of the nozzle #1 during the next pass (S206). If the position of the nozzle #1 during the next pass is in the normal printing region ("No" at S207), the scheduling table for pass 1 is finished. However, the nozzle #1 during pass 2 is in the position of the second raster line, and is in the upper-end printing region, so the printer driver process proceeds to step S208.

Next, after initializing the nozzle number i (S208), the printer driver calculates a position L of the nozzle #i (S209). If that position is in the upper-end printing region ("Yes" at S210) and the position L has been registered in the scheduling table ("Yes" at S211), then the scheduling data for the position L is deleted. The last nozzle is #5, so the printer driver repeats the above processes until i=5 (S209 through S214). If, in the middle of this, the position L of the nozzle #i is in the normal printing region ("No" at S210), the position of the virtual head is moved by the carry amount F (S215) and the printer driver process returns to step S206.

In other words, the positions of the nozzles for pass m and the positions of the nozzles for passes after pass m are compared through the process of step S209 through step S214. If, as a result of the comparison, any positions match, the scheduling data for those positions are deleted.

FIG. 15B shows a scheduling table when the answer is "No" at step S210 the first time. Until this point, the positions of the nozzles in pass 2 are compared to the scheduling table created as shown in FIG. 15A. As a result of the comparison, no positions match, and therefore the scheduling table is not changed from the one shown in FIG. 15A.

FIG. 15C shows a scheduling table when the answer is "No" at step S210 the second time. Until this point, the positions of the nozzles in pass 3 are compared to the scheduling table in FIG. 15B. As a result of the comparison, no positions match, and therefore the scheduling table is not changed from the one shown in FIG. 15A.

FIG. 15D shows a scheduling table when the answer is "No" at step S210 the third time. Until this point, the positions of the nozzles in pass 4 are compared to the scheduling table in FIG. 15C. However, the nozzle #4 in pass 4 is not in the upper-end printing region, so that the answer is "No" at S210 when i=4. Furthermore, pass 4 is a dot-forming process in normal printing, so the positions of the nozzles in pass 4 are calculated from the virtual printing parameters for normal printing (i.e., the nozzle pitch k, the carry amount F, the starting position Ls), the nozzle number i, the pass number, and so on.

FIG. 15E shows a scheduling table when the answer is "No" at step S210 the fourth time. Up until this point, the position of the nozzle #1 in pass 5 is compared to the scheduling table shown in FIG. 15D. (The nozzle #2 in pass 5 is not in the upper-end printing region, so the answer is "No" at S210 when i=2.) The nozzle #1 in pass 5 is in the position of the thirteenth raster line, and scheduling data indicating "position:13" is already registered to the scheduling table, so the printer driver deletes the scheduling data (S212).

The nozzle #1 in pass 6 is in the normal printing region, so in pass 6 the answer at S207 is "No," and the process of creating the scheduling table for pass 1 is finished. The scheduling table (FIG. 15E) at this point thereby becomes the scheduling table for pass 1.

<Regarding Creation of Scheduling Tables for Normal Printing>

Figure 16:
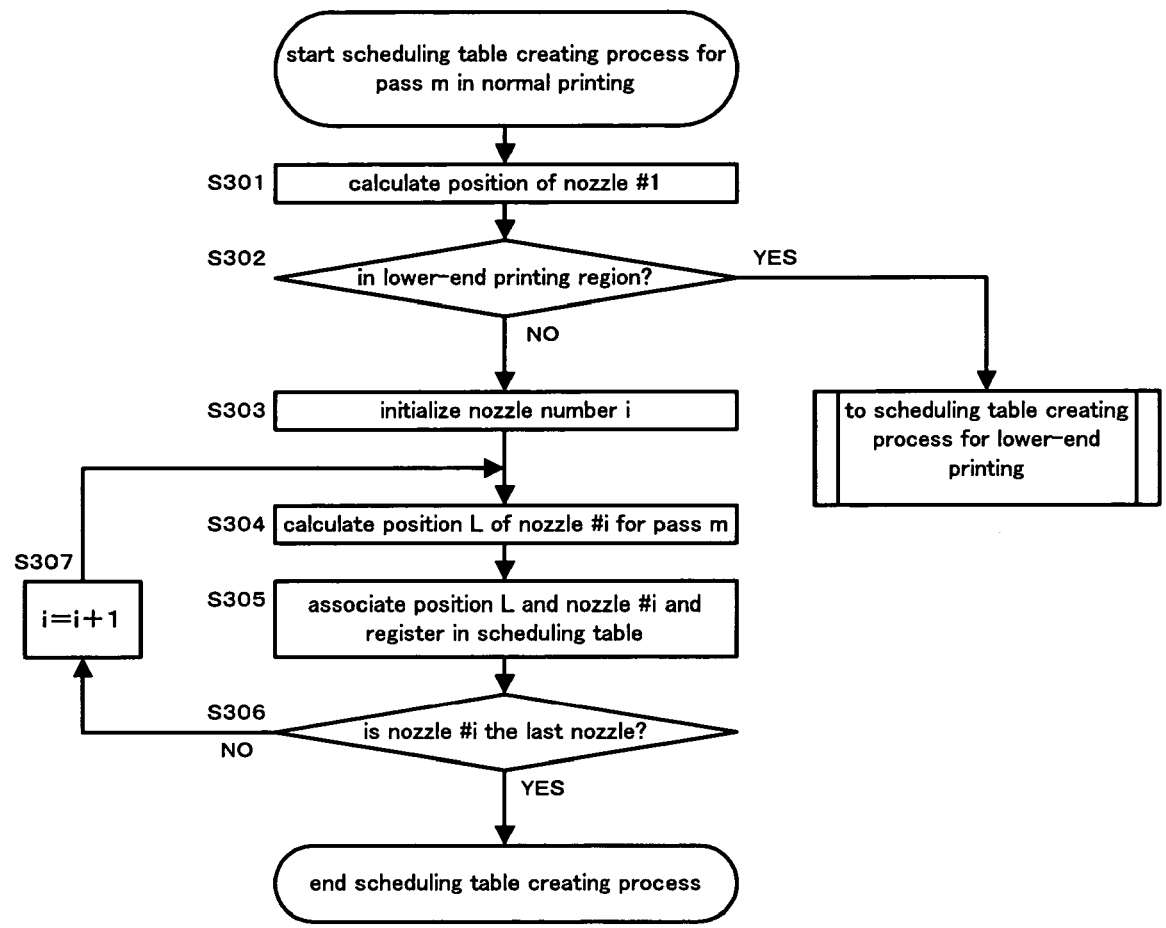
FIG. 16 is a flowchart showing a process for creating the scheduling table for pass m in normal printing according to the first embodiment.

FIG. 16 is a flowchart showing a process for creating the scheduling table for pass m during normal printing according to the first embodiment. The number of passes for performing upper-end printing is set ahead of time, and in the present embodiment it is until pass 3. For this reason, the printer driver executes the following processes from pass 4 on. Scheduling tables for each of passes 4 through 6 are shown at the bottom of FIG. 17A through FIG. 17C. At the top of each drawing is shown a conceptual diagram of the content of processes when creating the scheduling tables.

First, the printer driver calculates a position L of the nozzle #1 during pass m (pass 4 at first) (S301), and determines whether or not the position is inside the lower-end printing region (S302). If the position of the nozzle #1 is in the lower-end printing region, the process of the printer driver proceeds to the process of creating a scheduling table for lower-end printing, which is described below. However, the nozzle #1 during pass 4 is in the position of the eighth raster line, so the printer driver process proceeds to step S303.

Next, the printer driver initializes the nozzle number i, and sets i=1 (the number of the first nozzle in the virtual printing parameters for normal printing) (S303). The printer driver then calculates a position L for the nozzle #1 during pass m (pass 4 being the first) (S304). The process in step S304 the first time is the same as the process in step S301, so the process in step S304 the first time may be omitted. The position L of the nozzle #i is calculated from the virtual printing parameters for normal printing (i.e., the nozzle pitch k, the carry amount F, the starting position Ls), the nozzle number i, the pass number m, and so on. The printer driver then associates the position L with the nozzle #i, and registers this in the scheduling table (S305). The last nozzle is #5, so the printer driver repeats the above processes until i=5 (S304 through S307).

In other words, a scheduling table is created in which the positions of the nozzles and the nozzle numbers are associated for pass m, through the process of step S303 through step S307. For example, a scheduling table for pass 4 is created as shown at the bottom of FIG. 17A.

It should be noted that, after a scheduling table for pass 9 has been created, the answer is "Yes" at step S302 when the scheduling table for pass 10 is attempted to be created. In this case, the printer driver process proceeds to the process of creating a scheduling table for lower-end printing. The scheduling tables for passes on or after pass 10 are thereby created by the process for creating scheduling tables for lower-end printing.

<Regarding Creation of Scheduling Tables for Lower-end Printing>

Figure 18:
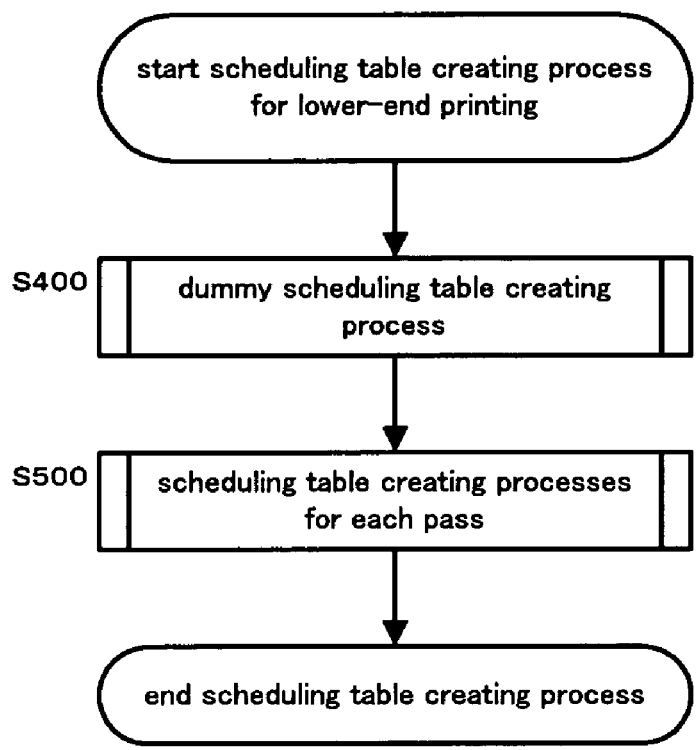
FIG. 18 is a flowchart showing a process for creating the scheduling table for lower-end printing according to the first embodiment.

FIG. 18 is a flowchart showing a process for creating the scheduling table during lower-end printing according to the first embodiment. Unlike the cases of upper-end printing or normal printing described above, during lower-end printing, a dummy scheduling table is created (S400) before creating scheduling tables for each pass, and then the scheduling tables for each pass are created based on this dummy scheduling table (S500).

Figure 19:
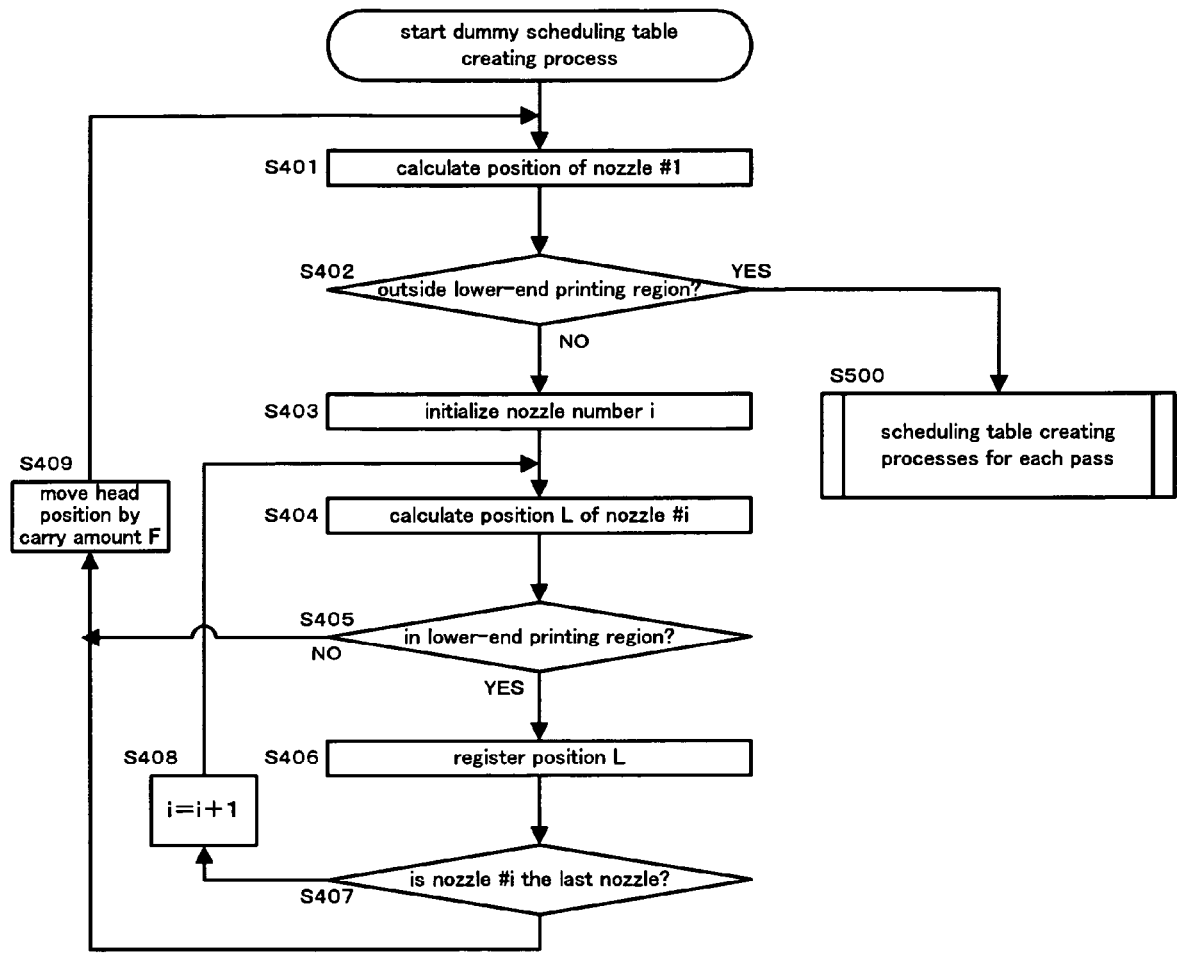
FIG. 19 is a flowchart showing a process for creating a dummy scheduling table.
Figure 20A:
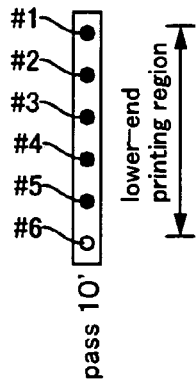
FIG. 20A through FIG. 20C are conceptual diagrams for explaining the dummy scheduling table.
Figure 20B:
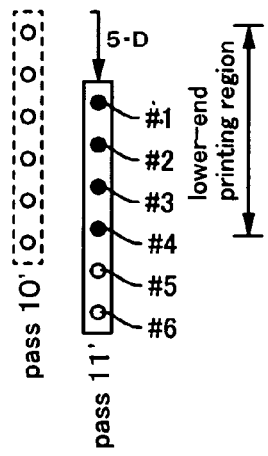
Figure 20C:
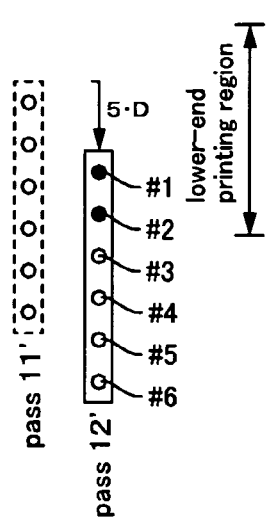

FIG. 19 is a flowchart showing a process for creating a dummy scheduling table. FIG. 20A through FIG. 20C are conceptual diagrams for explaining the dummy scheduling table.

The dummy scheduling table indicates the positions of raster lines formed in the lower-end printing region by passes after pass 9, as though normal printing were performed after pass 9. For this reason, during the process for creating the dummy scheduling table, the virtual printing parameters for normal printing are used.

First, the printer driver assumes that the carrying process of normal printing has been performed after the last pass (pass 9) for normal printing, calculates a position L of the nozzle #1 in pass 10' (S401), and determines whether or not that position is in the lower-end printing region (S402). The position of the nozzle #1 in pass 10' is the position of the thirty-eighth raster line, so the answer at step S402 is "No."

Next, the printer driver initializes the nozzle number i, and sets i=1 (S403). The printer driver then calculates a position L for the nozzle #1 during pass m (pass 10' being the first) (S404). When i=1, the process in step S404 is the same as the process in step S401, so the process in step S404 may be omitted. The position L of the nozzle #i is calculated from the virtual printing parameters for normal printing (i.e., the nozzle pitch k, the carry amount F, the starting position Ls), the nozzle number i, the pass number m, and so on. If the position of the nozzle #i is in the lower-end printing region ("Yes" at S405), the printer driver registers the position L in the dummy scheduling table (S406). In the dummy scheduling table, there is no need to associate anything with the nozzle numbers, unlike the scheduling tables described until now. For this reason, the amount of data in the dummy scheduling table is smaller compared to the scheduling tables. The printer driver repeats these processes until i=5, since the last nozzle is #5 (S404 through S408), and registers the positions of each nozzle in that pass in the dummy scheduling table.

When repeating the processes in step S404 through step S408, if a position L of a nozzle is outside the lower-end printing region ("No" at S405), then the printer driver interrupts registration of the position L of the nozzle in that pass, and proceeds to step S409. In step S409, the carrying process of normal printing is assumed to have been performed before performing the next pass, and the position L of the nozzle #1 in the next pass is calculated (S401) In this way, the positions of the nozzles are registered in the dummy scheduling table for the next pass as well (S401 through S409). The dummy scheduling table thus created indicates the positions of the raster lines to be formed in the lower-end printing.

The pass 12 is performed through normal printing, and if the carrying process of normal printing is further performed, the position of the nozzle #1 is the position of the fifty-third raster line. For this reason, the answer at step S402 is "Yes," and the creation of the dummy scheduling table is finished. The printer driver then uses the dummy scheduling table at this point (FIG. 20C) to perform the process for creation of a scheduling table for each of the passes.

Figure 21:
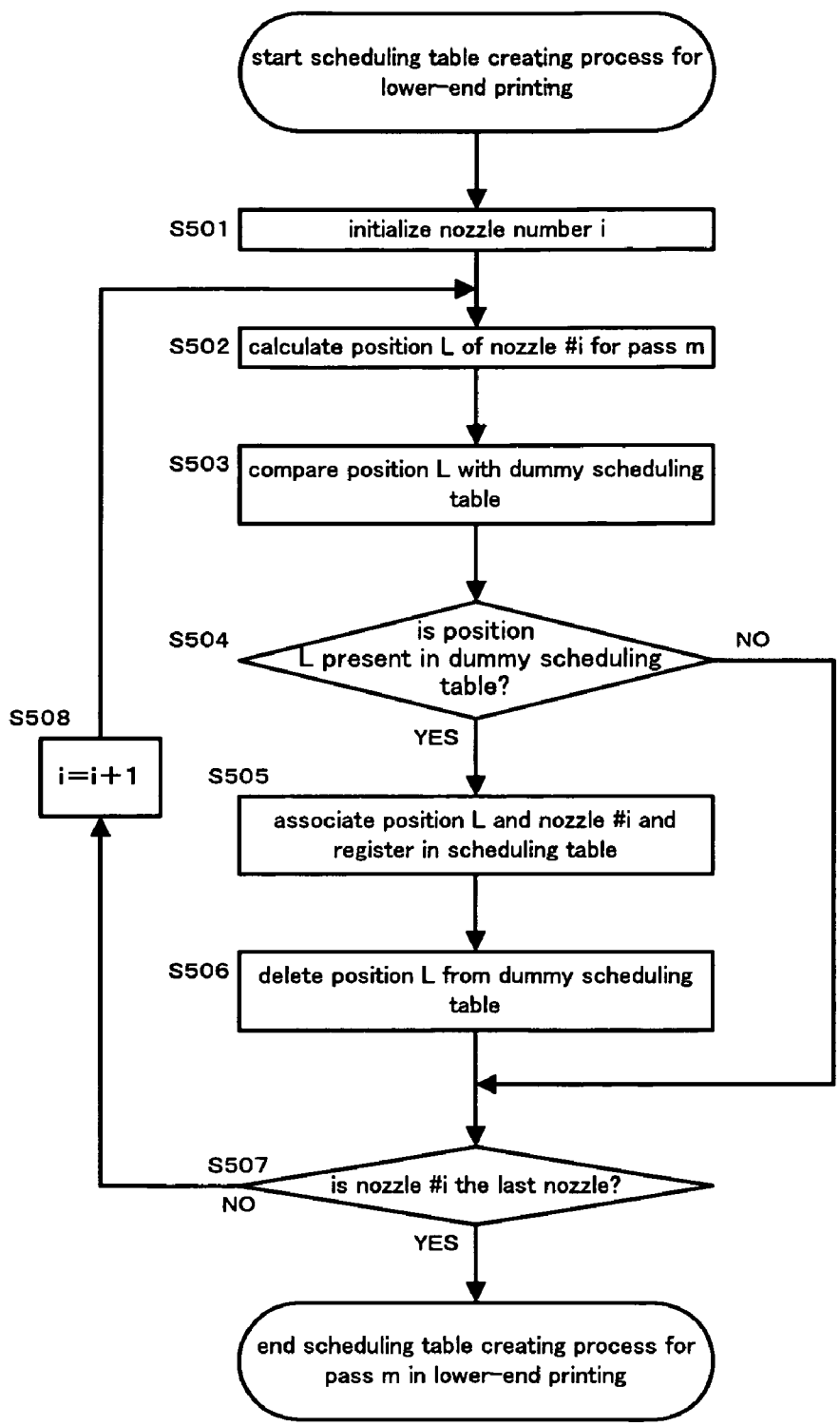
FIG. 21 is a flowchart showing a process for creating scheduling tables for each pass based on the dummy scheduling table.
Figure 22A:
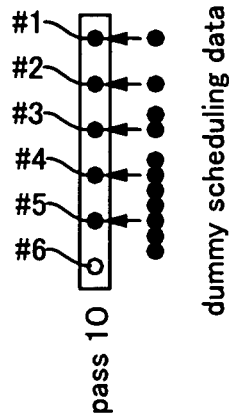
FIG. 22A through FIG. 22C are conceptual diagrams for explaining the scheduling tables for each pass.
Figure 22B:
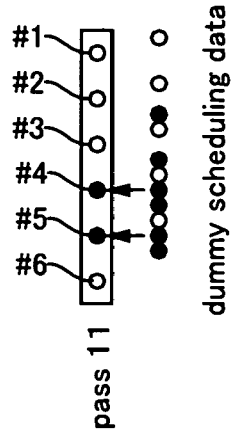
Figure 22C:
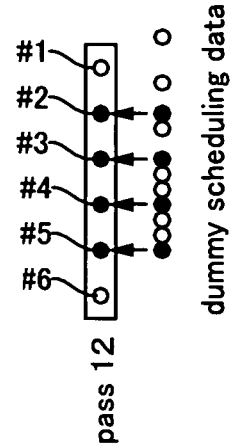

FIG. 21 is a flowchart showing a process for creating scheduling tables for each pass based on the dummy scheduling table. FIG. 22A through FIG. 22C are conceptual diagrams for explaining the scheduling tables for each pass. As described below, the printer driver compares the positions of the nozzles in each pass in the lower-end printing with the dummy scheduling table and creates scheduling tables for each pass based on the results of the comparison.

The printer driver first initializes the nozzle number i, and sets i=1 (the number of the first nozzle in the virtual printing parameters for lower-end printing) (S501). The printer driver then calculates a position L for the nozzle #1 during pass m (pass 10 being the first) (S502). The position L of the nozzle #i is calculated from the virtual printing parameters for lower-end printing (i.e., the nozzle pitch k, the carry amount F, the starting position Ls), the nozzle number i, the pass number m, and so on. The position of the nozzle #1 during pass 10 is the starting position Ls.

Next, the printer driver compares the calculated position L and the dummy scheduling table (S503). Specifically, the printer driver compares whether or not the calculated position L matches any positions registered in the dummy scheduling table.

If the position L is present in the dummy scheduling table ("Yes" at S504), the printer driver associates the position L and the nozzle #1 and registers them in the scheduling table for pass m (S505), in order to form a raster line at the position L during lower-end printing. The printer driver then deletes the registration of the position L from the dummy scheduling table. This is to speed up processing when repeating step S503 later.

If, on the other hand, the position L is not present in the dummy scheduling table ("No" at S504), there is no need to form a raster line at the position L in the lower-end printing, so the printer driver process proceeds to step S507, without performing the process for registering to the scheduling table. The last nozzle is #5, so the printer driver repeats the above processes until i=5 (S502 through S508). In other words, a scheduling table is created in which the positions of the nozzles and the nozzle numbers are associated for pass m, through the processes of step S501 through step S508.

In the top of FIG. 22A through FIG. 22C, the positions of the nozzles in each pass and the positions registered in the dummy scheduling data are conceptually shown. Of the circles indicating registered content of the dummy scheduling table, black circles indicate registered positions, while white circles indicate positions which have been deleted in step S506. As shown in FIG. 22A, the positions of the nozzle #1 through the nozzle #5 in pass 10 are registered to the dummy scheduling table. For this reason, the scheduling table for pass 10 is made up of five pieces of information, as shown at the bottom of FIG. 22A. On the other hand, when creating the scheduling table for pass 10, the positions of the five pieces of information in the dummy scheduling table are deleted in step S506. As a result, the dummy scheduling table used when creating the scheduling table for pass 11 is as shown at the top of FIG. 22B. As a result of comparing the positions of the nozzles in pass 11 with the dummy scheduling table, the scheduling table for pass 11 is made up of the two pieces of information as shown at the bottom of FIG. 22B. Similarly, the scheduling table for pass 12 is made up of four pieces of information, as shown at the bottom of FIG. 22C.

Furthermore, when the scheduling table for pass 12 is finished, the position of the nozzle #1 reaches the finishing position Lf (=40; see FIG. 13), so creation of the scheduling table is finished.

<Regarding Rasterization>

The created scheduling tables are used in rasterization. The scheduling tables of the present embodiment are created in the order of printing for each pass. Therefore, unlike the case shown in the reference example described above, the printer driver of the present embodiment can begin rasterization and can begin sending print data for each pass for which rasterization is complete, before finishing creation of scheduling tables for all passes. This point is described below.

Figure 23A:
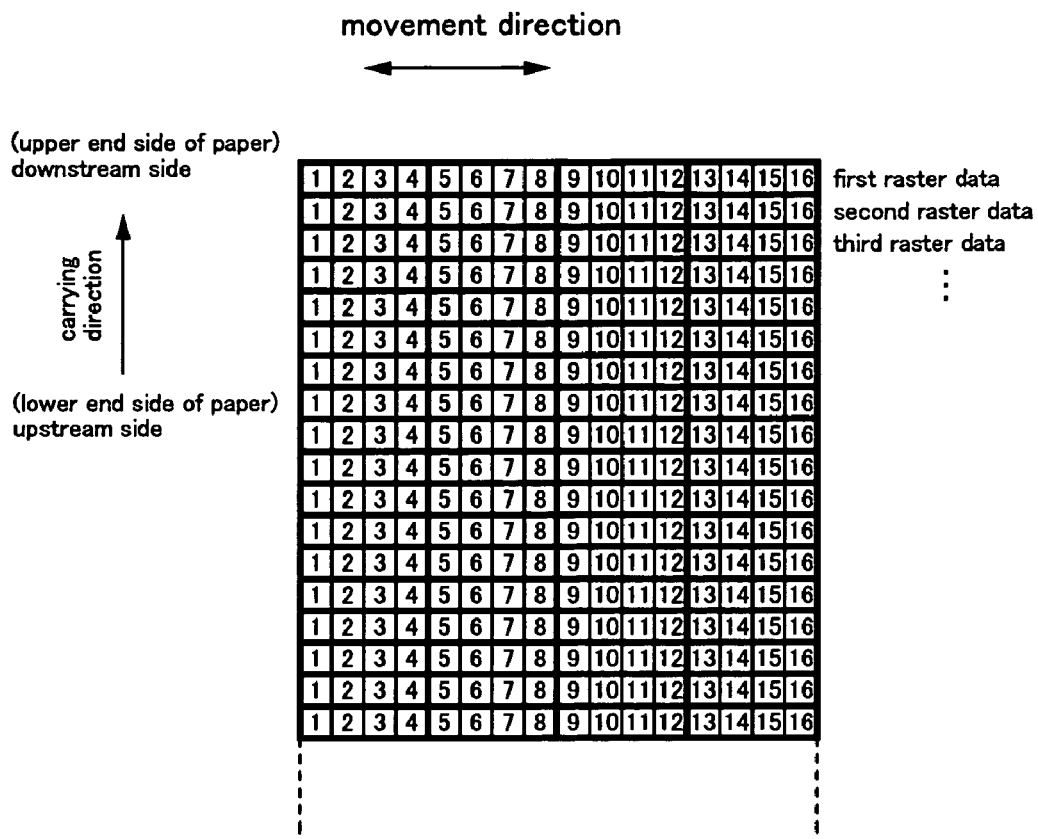
FIG. 23A is an explanatory diagram showing image data (image data after halftoning) before rasterization.

FIG. 23A is an explanatory diagram showing image data (image data after halftoning) before rasterizing. The squares in the drawing indicate pixels which make up the image. The numbers within the squares indicate the number of the pixel. In order to simplify the description, the number of pixels arranged in the movement direction is 16 pixels.

Halftoned image data is made up of pixel data with 2 bits of data per pixel. For this reason, assuming that image data is stored in a memory that stores one byte of information per address, pixel data for four pixels is stored per address. The bold rectangles in the drawing indicate pixels which correspond to the pixel data stored in one address of the memory.

The "raster data" in the drawing is pixel data which corresponds to raster lines, or in other words, a plurality of pieces of pixel data which correspond to a plurality of pixels arranged in the movement direction. Here, one piece of "raster data" is 4-byte data, which includes 16 pieces of pixel data.

Figure 23B:
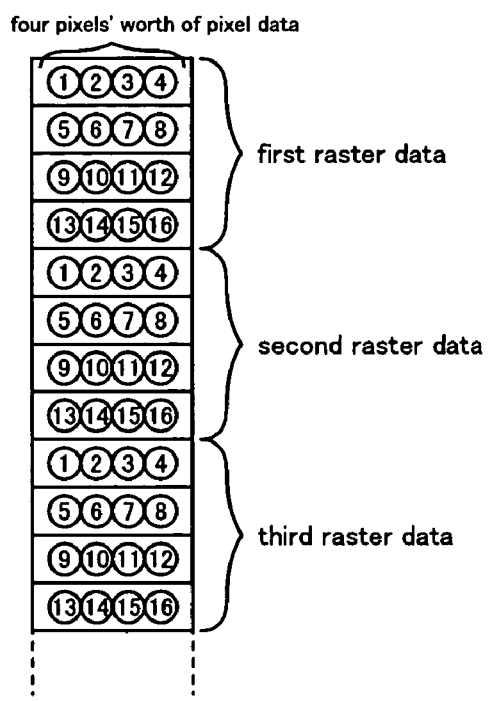
FIG. 23B is an explanatory diagram showing the order of pixel data before rasterization.

FIG. 23B is an explanatory diagram showing the order of pixel data before rasterizing. Each rectangle in the drawing indicates one byte of data (pixel data for four pixels). The circles in the rectangle indicate pixel data stored in the one byte of data, and the numbers inside the circles indicate the numbers of the pixels which correspond to the pixel data. For example, pixel data which corresponds to the first through the fourth pixels is stored in the first byte of data.

Unrasterized pixel data is stored in the memory in the order of the raster lines. Put another way, the pixel data is stored in the order of the raster lines in contiguous addresses in the memory. However, printing is not performed by the printer in this order. For example, in pass 1, the first, fourth, seventh, tenth, and thirteenth raster lines are formed, so printing is not performed in the order of the raster lines. Accordingly, the printer driver needs to rearrange the pixel data into an order appropriate for printing, through rasterization.

Figure 24A:
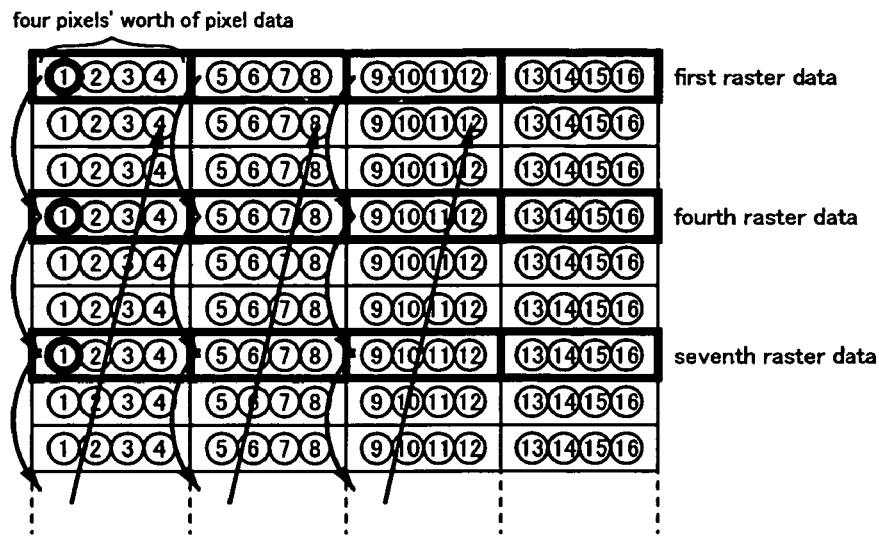
FIG. 24A is an explanatory diagram showing a rasterizing process for creating print data for pass 1.

FIG. 24A is an explanatory diagram showing a rasterizing process for creating print data for pass 1. When interlaced printing is performed by moving the head from left to right, the first pixel data, which are indicated by the bold circles in the drawing, are needed in order to form dots in the first pixels. However, before rasterization, the first pixel data, which are indicated by the bold circles, are not stored in contiguous addresses in the memory.

The printer driver accordingly rearranges the pixel data into the order shown by the arrows in the drawing. With this, the pixel data shown by the bold circles are stored in addresses contiguous in the memory. The printer driver, at this point, references the scheduling table and decides which raster data to extract the pixel data from. When creating the print data for pass 1, the scheduling table (FIG. 15E) for pass 1 is referenced, and pixel data from the first, fourth, seventh, and tenth raster data is extracted from the left.

Figure 24B:
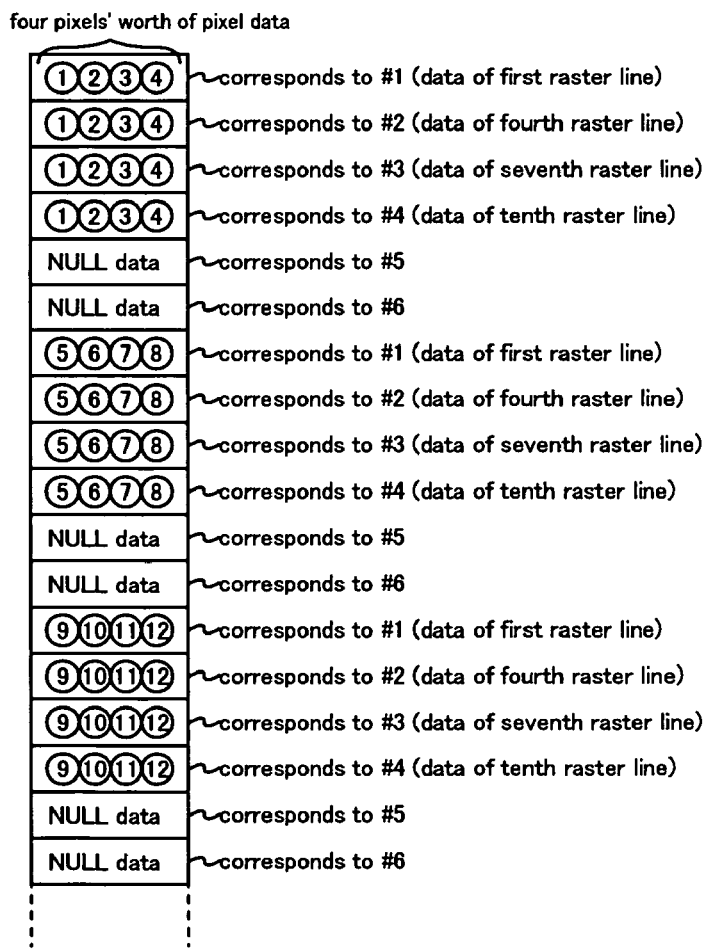
FIG. 24B is an explanatory diagram showing the order of pixel data after rasterization, the order of pixel data being contained in the print data for pass 1.

FIG. 24B is an explanatory diagram showing the order of pixel data after rasterizing, the order of pixel data being contained in the print data for pass 1. The first byte of pixel data is extracted from the first raster data, and associated with the nozzle #1. The next byte of pixel data is extracted from the fourth raster data, and associated with the nozzle #2. In this way, pixel data is associated one byte at a time from the first nozzle (the nozzle #1) until the last nozzle (the nozzle #6). Then, the pixel data associated with the first nozzle is arranged after the pixel data associated with the last nozzle. By repeating this, the pixel data included in the print data for pass 1 is created.

The NULL data in the drawing is not the pixel data extracted from the image data, but data created by the printer driver, and is made up of pixel data indicating non-ejection of ink (non-formation of dots). NULL data is allocated to nozzles which are not associated with a position in the scheduling table. Here, NULL data is associated with the nozzle #5 and the nozzle #6.

The printer driver then sends to the printer the print data for the pass for which rasterization has finished.

Figure 25:
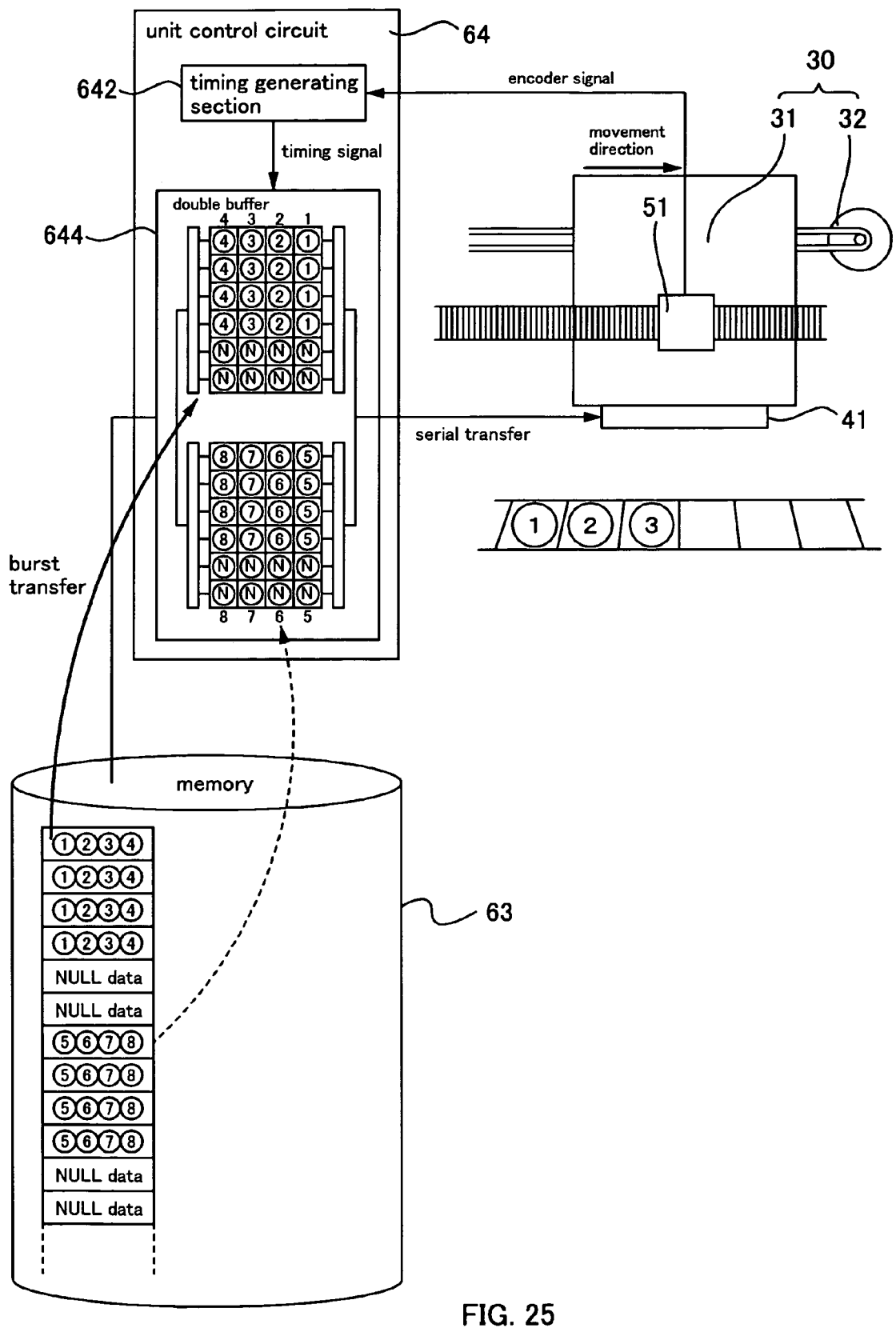
FIG. 25 is an explanatory diagram of a dot-forming process based on the print data.

FIG. 25 is an explanatory diagram of a dot-forming process based on the print data. The head 41 ejects ink based on the data transferred from the unit control circuit 64, thereby forming dots on the paper. In the drawing, three dots have been formed by ink droplets ejected based on the first through third pixel data.

The unit control circuit 64 is provided with a timing generating section 642 and a double buffer 644. The timing generating section 642 generates a timing signal in accordance with a signal from the linear encoder 51 and outputs it to the double buffer 644. Two buffers are provided in the double buffer 644 for storing pixel data. Each buffer can store one byte's worth of data per nozzle (i.e., four pixels' worth of pixel data). Every time a timing signal is received, the double buffer 644 serially transfers, to the head 41, one pixel's worth of pixel data for all nozzles, among the pixel data which are stored in the buffer.

Next, operation when ink droplets are ejected based on the print data is described.

First, the printer driver sends the print data to the printer 1. The print data contains the pixel data needed for at least a single pass. Each pixel data indicates a dot forming condition for one pixel (i.e., large dot, medium dot, small dot, no dot), and has a data amount of two bits. The pixel data received by the printer 1 are in an order appropriate for printing because of the rasterization performed by the printer driver (described above), and the printer 1 stores in the memory 63 the pixel data according to this order. One address in the memory 63 can stored one byte of information, so four pixel' worth of pixel data can be stored per address.

The unit control circuit 64 stores the pixel data stored in contiguous addresses in the memory 63 into one of the buffers of the double buffer 644 through a burst transfer. Here, six bytes' worth of pixel data is burst transferred to the double buffer 644 from the memory 63. Pixel data corresponding to adjacent nozzles are stored in adjacent addresses in the memory 63 because of the rasterization of the printer driver. Four bytes' worth of pixel data for all nozzles can therefore be burst transferred.

Next, the unit control circuit 64 drives the carriage motor 32 and moves the carriage 31 in the movement direction. Every time the carriage 31 moves $\frac{1}{180}$ of an inch, the linear encoder 51 outputs a pulse signal of one cycle. The timing generating section 642 generates a timing signal in accordance with a signal from the linear encoder 51.

When the first timing signal is received, the double buffer 644 performs a serial transfer to the head 41 of the pixel data stored in a first region indicated by a bold line in the drawing. Pixel data corresponding to the first pixel for all the nozzles are stored in this region. The head 41 ejects (or does not eject) ink from each nozzle according to the first pixel data. As a result, a dot is formed which corresponds to the first pixel data in the first pixel (pixel #1) on the paper.

Since the carriage 31 is moving in the movement direction while ink is being ejected from the head 41, the double buffer 644 continues to receive the prescribed timing signals. When the next timing signal is received, the double buffer 644 performs a serial transfer to the head 41 of the pixel data that are stored in a second region, and the head 41 ejects ink in accordance with the pixel data. In this way, ink is ejected from the head 41 intermittently in accordance with the timing signal.

The unit control circuit 64 transfers a set of pixel data to one of the buffers of the double buffer 644, and then transfers the next set of pixel data to the other buffer from the memory 63. The double buffer 644 can thereby transfer to the head 41 the pixel data in the fourth region and then transfer to the head 41 the pixel data in the fifth region which is in the other buffer. After transferring to the head 41 the pixel data in the fourth region, the unit control circuit 64 transfers the next set of pixel data (the ninth through twelfth pixel data) from the memory 63 to the first region through the fourth region of the double buffer. The unit control circuit 64 thereby transfers pixel data in an alternating manner to the two buffers of the double buffer 644.

Note that nozzle groups are provided to the head 41 for each color, and that the double buffer 644 is provided for each nozzle group, or in other words, for each color. However, the timing generating section 642 generates a common timing signal for the plurality of the double buffer 644 provided for each color. As a result, ink droplets are ejected at a common timing from the nozzle groups of each color.

The print data for pass 1 associates NULL data to the nozzle #5 and the nozzle #6. NULL data is therefore stored in the regions of the double buffer corresponding to the nozzle #5 and the nozzle #6. As a result, even if this data is transferred to the head, the nozzle #5 and the nozzle #6 do not eject ink. In other words, the nozzle #5 and the nozzle #6 are nozzles which do not eject ink (the unused nozzles) during pass 1.

In the first embodiment, described above, print data is not created and sent after finishing creation of all the scheduling tables, but instead scheduling tables are created for each pass and rasterization is performed pass by pass, and then the print data for each pass is sent to the printer in sequence. The printer can thereby speed up the start of printing.

Second Embodiment

<Regarding Partial Overlap Printing>

In the first embodiment described above, only one nozzle formed one raster line. However, if a certain nozzle suffered from faulty ejection, the raster line formed by that nozzle would be defective, and the resulting printed image would have stripes. In particular, nozzles which are positioned at the ends of the nozzle groups (the nozzle #1 and the nozzle #6 in the case of the model example with six nozzles) are prone to faulty ejection, which entails a risk of defective raster lines being formed by those nozzles. Accordingly, specific raster lines are formed by two or more nozzles in "partial overlapped printing," which is described below, so even if a nozzle suffers from faulty ejection, defective raster lines can be reduced.

Figures 26A, 26B:
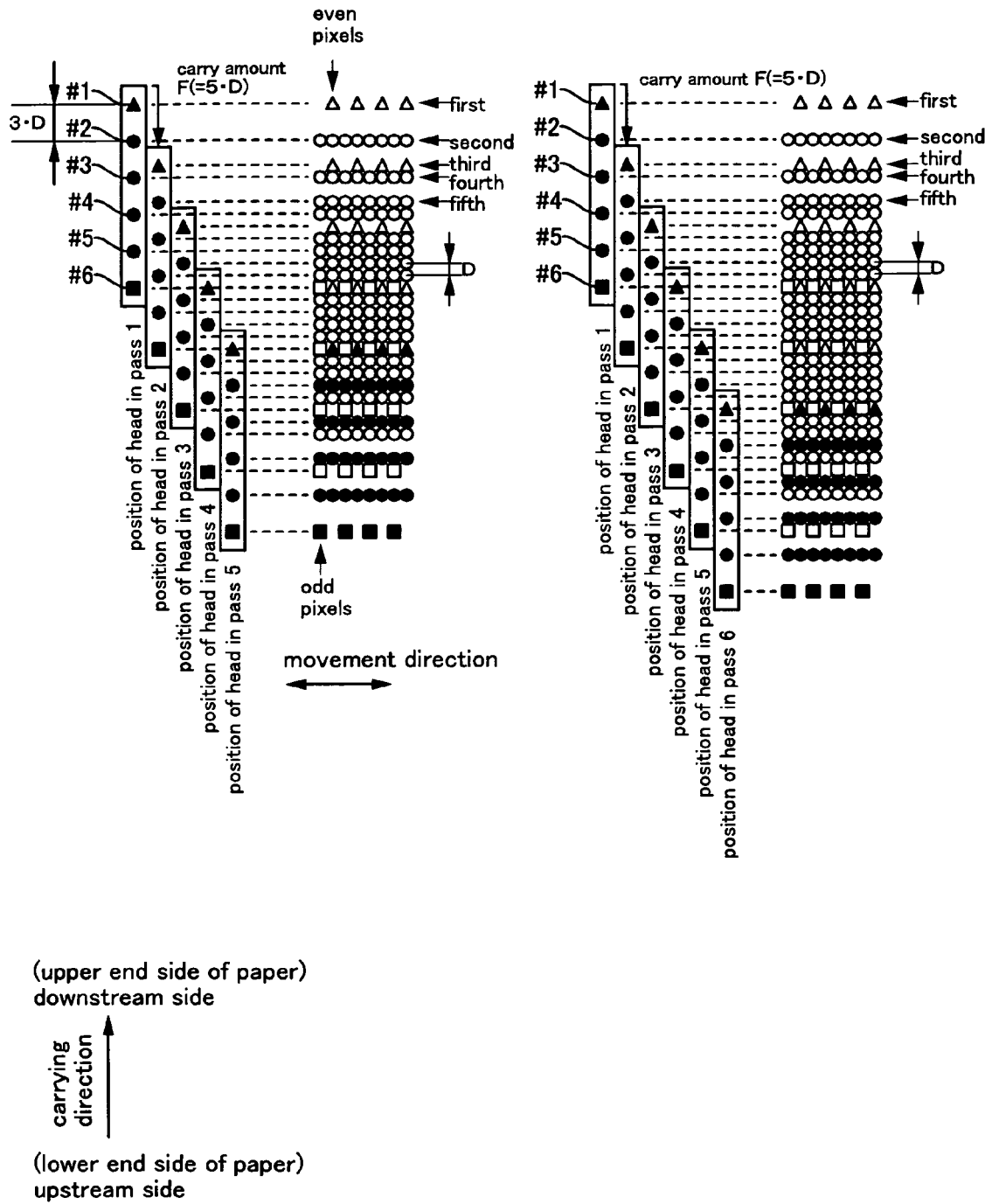
FIG. 26A and FIG. 26B are explanatory diagrams of partial overlapped printing.

FIG. 26A and FIG. 26B are explanatory diagrams of partial overlapped printing. FIG. 26A shows the positions of the head (or nozzle group) and how dots are formed in passes 1 to 5. FIG. 26B shows the positions of the head and how dots are formed in passes 1 to 6. For the sake of description, there are triangular and square nozzles and dots, but in actuality all nozzles and dots are circular.

In partial overlapped printing, a nozzle which is positioned on the end upstream in the carrying direction from the nozzle group (also called a "POL-bottom nozzle") and a nozzle which is positioned on the end downstream in the carrying direction from the nozzle group (also called a "POL-top nozzle") perform the same function as one nozzle positioned in a central portion of the nozzle group. For example, in FIG. 26A and FIG. 26B, the nozzle #1 and the nozzle #6 only form half dots compared to the nozzle #2 through the nozzle #5. However, the number of nozzles which can eject ink in FIG. 26A and FIG. 26B (six) is greater compared to the number of nozzles which can eject ink in FIG. 7A and FIG. 7B (five).

In partial overlapped printing, the nozzle which is positioned at the ends upstream in the carrying direction forms dots intermittently, every other dot. In other passes, the nozzle positioned at the end downstream in the carrying direction forms dots such that the already formed intermittent dots are interpolated (i.e., between the dots). The two nozzles positioned at the ends thereby perform the same function as one nozzle positioned in the central portion. For example, in FIG. 26A and FIG. 26B, the nozzle #6 forms dots (the dots shown as squares) every other dot in a certain pass, and then the nozzle #1 forms dots (the dots shown as triangles) in another pass, filling the space between the dots, thereby completing a single raster line. Here, the dots shown as squares are formed in odd pixels on the paper, and the dots shown as triangles are formed in even pixels on the paper.

With partial overlapped printing, a drop in the image quality of raster lines formed by a plurality of nozzles due to variations in ink ejection can be suppressed. In particular, variations in ink ejection by nozzles on the ends is large compared with nozzles in the central portion, so if a raster line formed by the nozzles on the ends is formed by a plurality of nozzles, an effect can be achieved of suppressing a drop in image quality.

Figure 27:
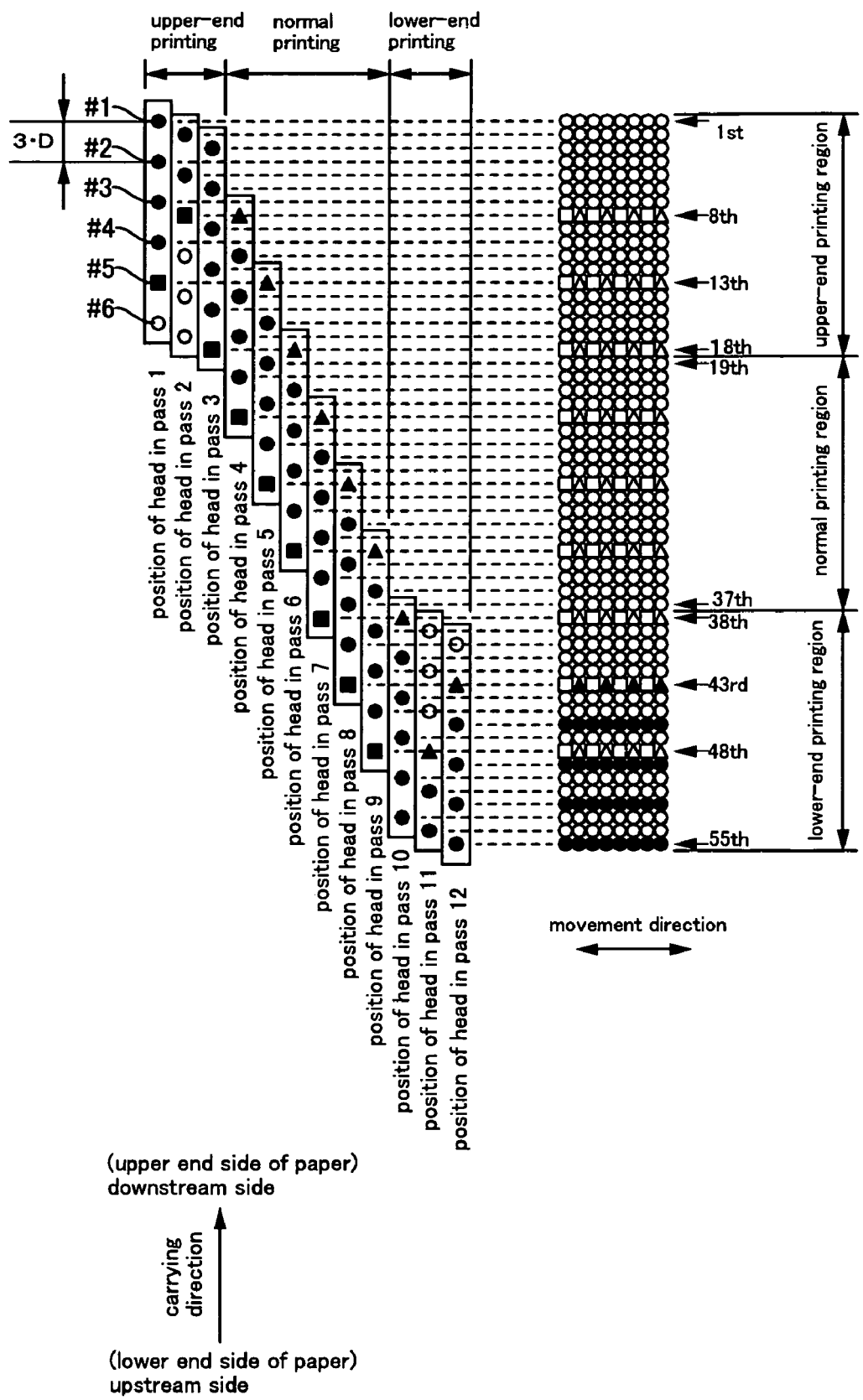
FIG. 27 is an explanatory diagram of upper-end printing and lower-end printing in partial overlapped printing.

FIG. 27 is an explanatory diagram of upper-end printing and lower-end printing in partial overlapped printing.

In the upper-end printing of the first embodiment (see FIG. 8), the nozzle #5 in pass 1, the nozzle #3 in pass 2, and the nozzle #6 in pass 3 are nozzles which do not eject ink. On the other hand, with upper-end printing in partial overlapped printing of the second embodiment, ink is also ejected from these nozzles, in order to interpolate the intermittent dots formed by the nozzle #1 in normal printing.

Furthermore, in the lower-end printing of the first embodiment (see FIG. 8), the nozzle #1 in pass 10, the nozzle #4 in pass 11, and the nozzle #2 in pass 12 each formed a raster line using a single nozzle. On the other hand, with lower-end printing in partial overlapped printing of the second embodiment, these nozzles form dots only in even pixels, in order to interpolate the intermittent dots formed by the nozzle #1 in normal printing.

<Regarding Parameters>

Figure 28:
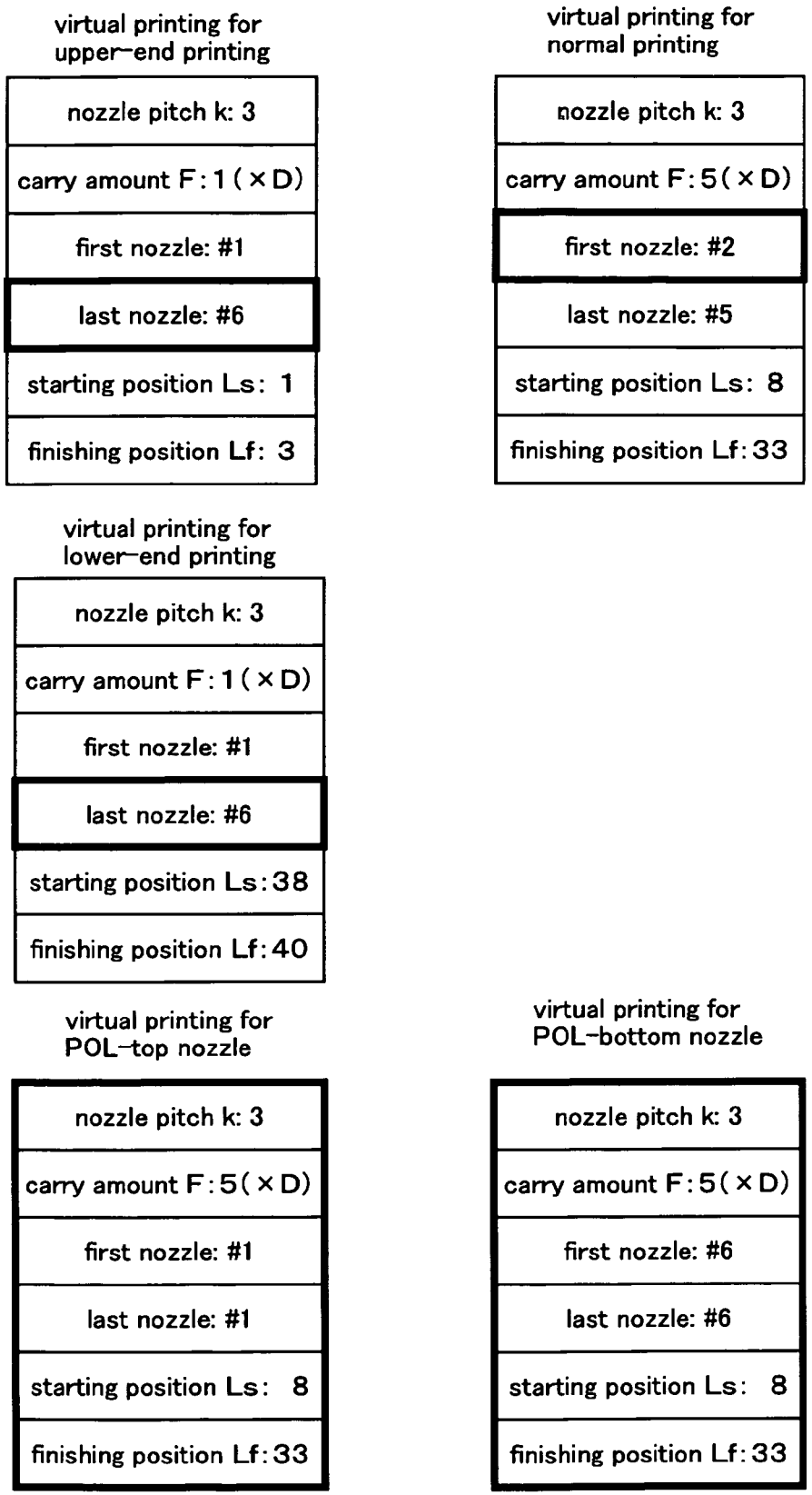
FIG. 28 is an explanatory diagram of parameters for setting conditions for virtual printing in a second embodiment.

FIG. 28 is an explanatory diagram of parameters for setting conditions for virtual printing in a second embodiment. The parameters surrounded by a bold line in the drawing are parts which differ from the parameters in the first embodiment (see FIG. 13). With the present embodiment, parameters "for the POL-top nozzle" are provided as parameters for virtual printing of partial overlapped printing by the nozzle at the end downstream in the carrying direction. Furthermore, parameters "for the POL-bottom nozzle" are provided as parameters for virtual printing of partial overlapped printing by the nozzle at the end upstream in the carrying direction. Additionally, the nozzle #1 forms dots intermittently in partial overlapped printing, so the first nozzle in the parameters for normal printing is not the nozzle #1, but rather the nozzle #2. Further, since the number of nozzles which can eject ink during normal printing is six, the last nozzle in upper-end printing and lower-end printing is consequently the nozzle #6.

<Regarding Creation of Scheduling Tables for Upper-end Printing>

Figure 29:
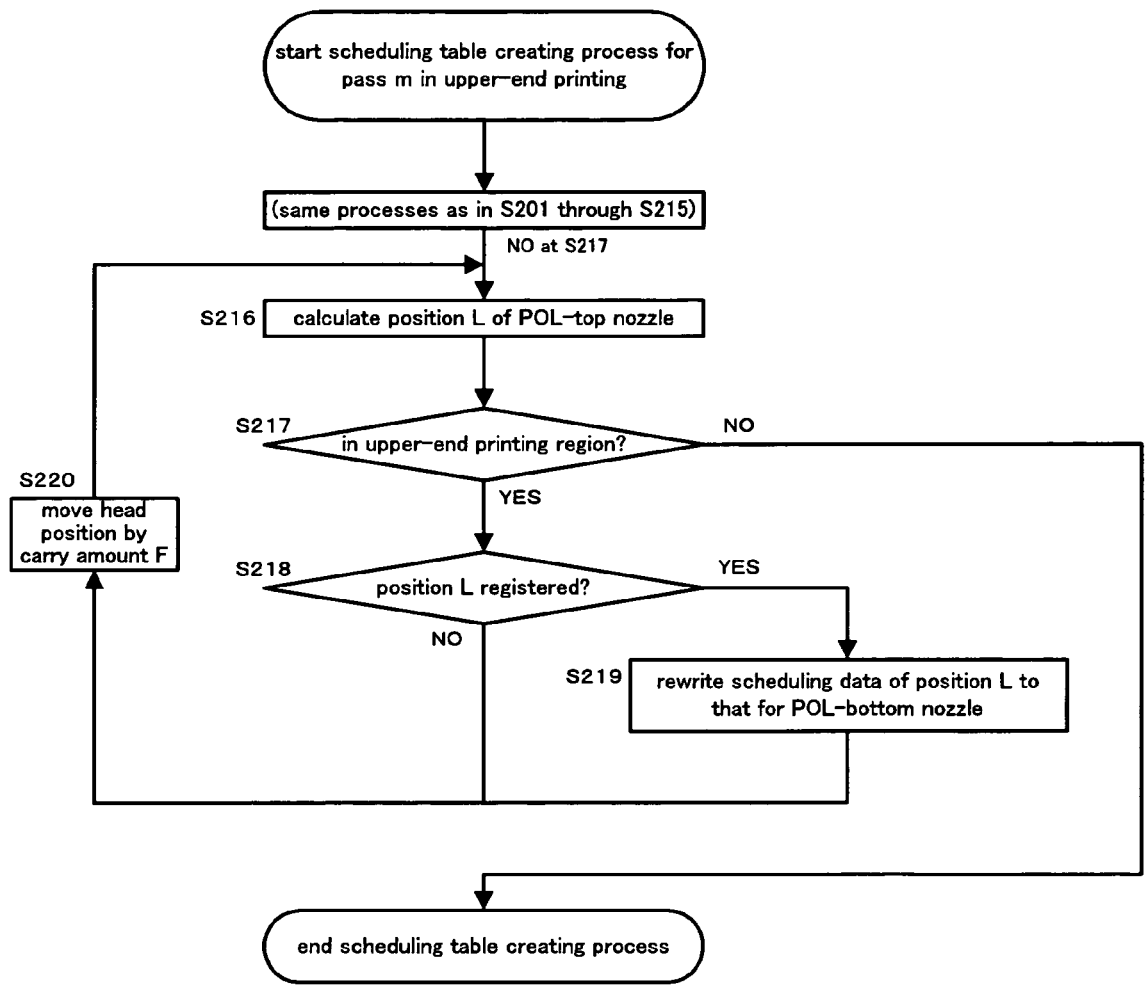
FIG. 29 is a flowchart showing a process for creating a scheduling table for pass m in upper-end printing according to the second embodiment.
Figure 30C:
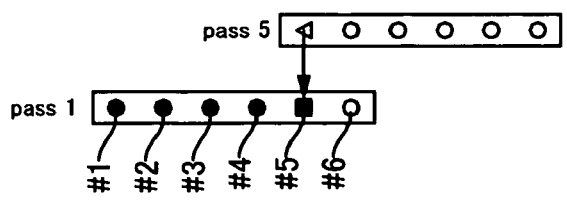
FIG. 30A through FIG. 30C are explanatory diagrams of stages in the process for creating the scheduling table for pass 1.
Figure 30B:
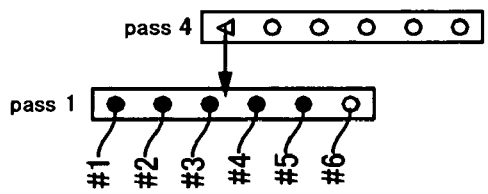
Figure 30A:
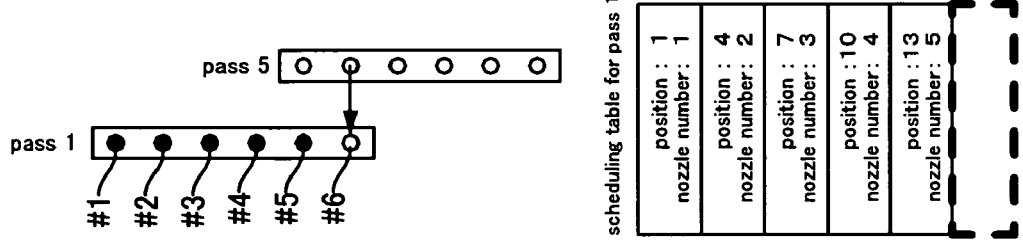

FIG. 29 is a flowchart showing a process for creating the scheduling table for pass m during upper-end printing according to the second embodiment. FIG. 30A through FIG. 30C are explanatory diagrams of stages in the process for creating the scheduling table for pass 1.

In the second embodiment, the processes from step S201 through step S215 (see FIG. 14) are the same as for the first embodiment, described above, so their description is omitted. In the second embodiment, after the answer at step S207, described above, is "No," the printer driver process proceeds to the following step S216.

Furthermore, in the second embodiment, the first nozzle in normal printing is the nozzle #2, so in step S208, the nozzle number is initialized to i=2. As a result, the scheduling data of "position:13" as shown in FIG. 15E is not deleted. On the other hand, the last nozzle in the upper-end printing is the nozzle #6, so the position of the nozzle #6 in pass 1 and the position of the nozzle #2 in pass 5 match, so the scheduling data of "position:16" is deleted. The scheduling table when the answer at step S217 is "No" in the second embodiment is therefore as shown in FIG. 30A.

After the processes of step S201 through step S215, the printer driver calculates a position L of the POL-top nozzle (the nozzle #1) based on the parameters "for the POL-top nozzle" (S216). The position L which is calculated at first (=8) is equivalent to the position of the nozzle #1 during pass 4. The printer driver then determines whether or not the position is in the upper-end printing region (S217). Since the position L calculated at first (=8) is in the upper-end printing region, the printer driver process proceeds to step S218.

Next, the printer driver determines whether or not the position L is registered in the scheduling table (S218). Since the position L calculated at first (=8) is not registered in the scheduling table, the position of the virtual head is moved by the carry amount F (S220) and the printer driver process returns to step S216. The scheduling table at this point is as shown in FIG. 30B.

The position L which is calculated next (=13) is equivalent to the position of the nozzle #1 during pass 5. The position L is registered in the scheduling table, so the answer at step S218 is "Yes." In this case, the printer driver rewrites the information of the position L in the scheduling table and adds information to the effect that the recording position is odd pixels (S219). Note also that in partial overlapped printing, the POL-bottom nozzle forms dots in odd pixels on the paper. The scheduling table at this point is as shown in FIG. 30C.

Similarly, the printer driver moves the position of the virtual head by the carry amount F (S220) and determines whether or not the position L which is equivalent to the position of the nozzle #1 during pass 6 is registered in the scheduling table (S218). Thereafter, the position L equivalent to the position of the nozzle #1 during pass 7 is calculated (S216), and that position L is not in the upper-end printing region (S217), so the printer driver finishes the process for creating the scheduling table for pass 1.

<Regarding Creation of Scheduling Tables for Normal Printing>

Figure 31:
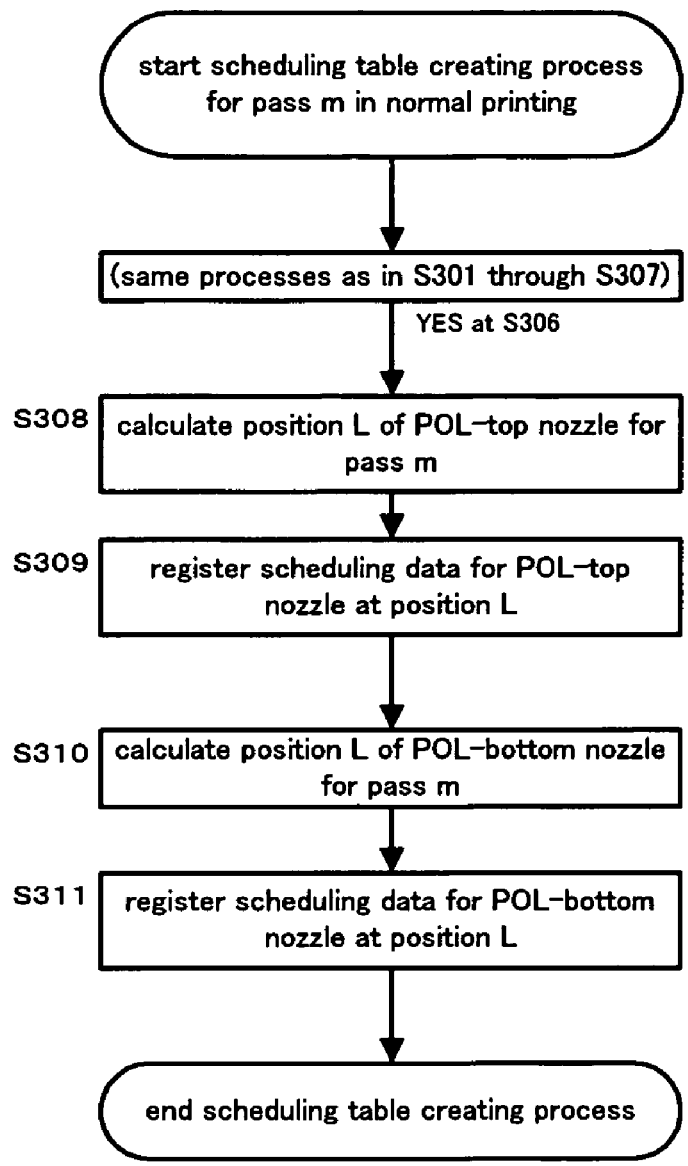
FIG. 31 is a flowchart showing a process for creating the scheduling table for pass m in normal printing according to the second embodiment.

FIG. 31 is a flowchart showing a process for creating the scheduling table for pass m during normal printing according to the second embodiment. FIG. 32A through FIG. 32C are explanatory diagrams of stages in the process for creating the scheduling table for pass 4.

In the second embodiment, the processes from step S301 through step S307 are the same as for the first embodiment (see FIG. 16), described above, so their description is omitted. In the second embodiment, after the answer at step S206, described above, is "Yes," the printer driver process proceeds to the following step S308.

First, the printer driver calculates a position L of the nozzle (the POL-top nozzle) positioned at the end downstream in the carrying direction of the nozzle group during pass m, based on the parameters "for the POL-top nozzle" (S308). The printer driver then associates the position L with the POL-top nozzle (here, the nozzle #1), and registers this in the scheduling table (S309). At this point, the printer driver adds information to the effect that the recording position is even pixels. Note also that in partial overlapped printing, the POL-top nozzle forms dots in even pixels on the paper. The scheduling table at this point is as shown in FIG. 32B.

Next, the printer driver calculates a position L of the nozzle (the POL-bottom nozzle) positioned at the end upstream in the carrying direction of the nozzle group during pass m, based on the parameters "for the POL-bottom nozzle" (S310). The printer driver then associates the position L with the POL-bottom nozzle (here, the nozzle #6), and registers this in the scheduling table (S311). At this point, the printer driver adds information to the effect that the recording position is odd pixels. Note also that in partial overlapped printing, the POL-bottom nozzle forms dots in odd pixels on the paper. The scheduling table at this point is as shown in FIG. 32C.

<Regarding Creation of Scheduling Tables for Lower-end Printing>

As in the case of lower-end printing in the first embodiment, described above, before creating scheduling tables for each pass for lower-end printing in the second embodiment, a dummy scheduling table is created (S400). The process for creating the dummy scheduling table of the second embodiment is the same as that of the first embodiment, described above, and description thereof is omitted. However, as a consequence of the number of nozzles which can eject ink in normal printing becoming six, the first nozzle during creation of the dummy scheduling table is not the nozzle #2 but rather the nozzle #1, and the last nozzle is not the nozzle #5, but rather the nozzle #6. Position:53-55 is assumed as being included in the lower-end printing region. As a result, the dummy scheduling table of the second embodiment is a dummy scheduling data of positions 53 through 55 added to the dummy scheduling table in FIG. 20C.

Figure 33:
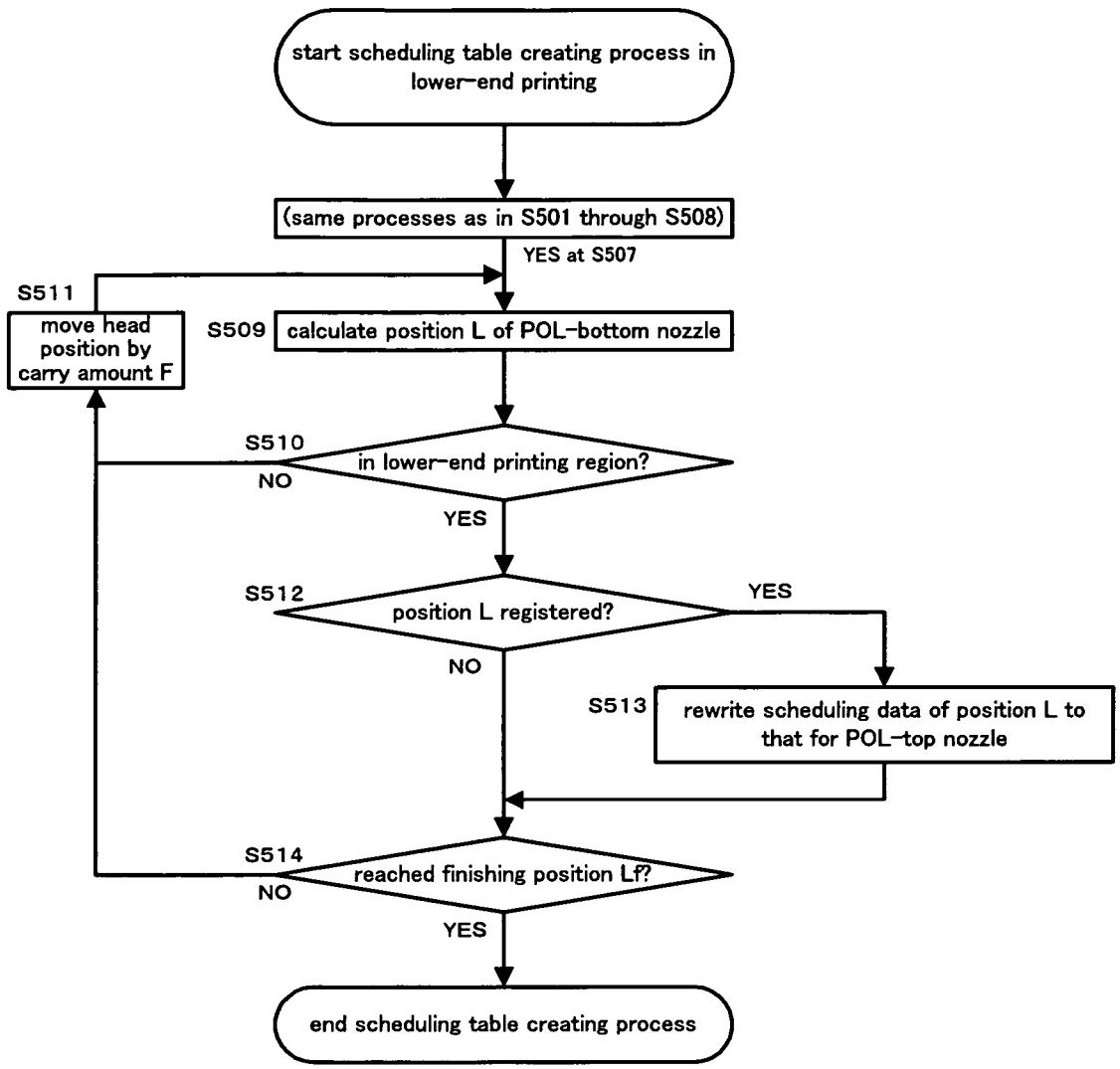
FIG. 33 is a flowchart showing a process for creating the scheduling table for each pass during lower-end printing according to the second embodiment.

FIG. 33 is a flowchart showing a process for creating the scheduling table for each pass during lower-end printing according to the second embodiment. FIG. 34A through FIG. 34D are explanatory diagrams of stages in the process for creating the scheduling table for pass 10.

In the second embodiment, the processes from step S501 through step S508 are the same as for the first embodiment (see FIG. 21), described above, so their description is omitted. In the second embodiment, after the answer at step S507, described above, is "Yes," the printer driver process proceeds to the following step S509. The scheduling table at this point is as shown in FIG. 34A.

First, the printer driver calculates a position L of the POL-bottom nozzle (the nozzle #6) based on the parameters "for the POL-bottom nozzle" (S509). Since the position L calculated at first (=23) is in the normal printing region ("No" at S510), the printer driver moves the position of the virtual head by the carry amount F (S511) and the printer driver process returns to step S509. Until the POL-bottom nozzle is positioned in the lower-end printing region, the position of the virtual head is moved by the carry amount F.

When the virtual head is in the position equivalent to pass 7, the position L of the POL-bottom nozzle (=38) is in the lower-end printing region ("Yes" at S510), so the printer driver determines whether or not the position L is registered in the scheduling table (S512). Here, the position L (=38) is registered in the scheduling table ("Yes" at S512), so the information on the position L in the scheduling table is rewritten and information is added to the effect that the recording position is even pixels (S513). Note also that in partial overlapped printing, the POL-top nozzle forms dots in even pixels on the paper. The scheduling table at this point is as shown in FIG. 34B.

The printer driver then moves the position of the virtual head by the carry amount F (S511) and calculates the position L of the POL-bottom nozzle equivalent to pass 8 (S509). However, this position L (=43) is not registered in the scheduling table, so the answer at S512 is "No." The scheduling table at this point is as shown in FIG. 34C. Similarly, the printer driver then moves the position of the virtual head by the carry amount F (S511) and calculates the position L of the POL-bottom nozzle equivalent to pass 9 (S509). However, this position L (=48) is not registered in the scheduling table, so the answer at step S512 is "No." The scheduling table at this point is as shown in FIG. 34D. The position of the nozzle #1 during pass 9 has reached the finishing position of the parameters "for the POL-bottom nozzle," so the answer at step S514 is "Yes," so the printer driver finishes the process for creating the scheduling table for pass 10.

<Regarding Rasterization>

The scheduling table created in the second embodiment is also used in rasterization. However, in the second embodiment, the information of the "scanning direction position" in the scheduling table is taken into consideration and rasterization is performed.

Figure 35A:
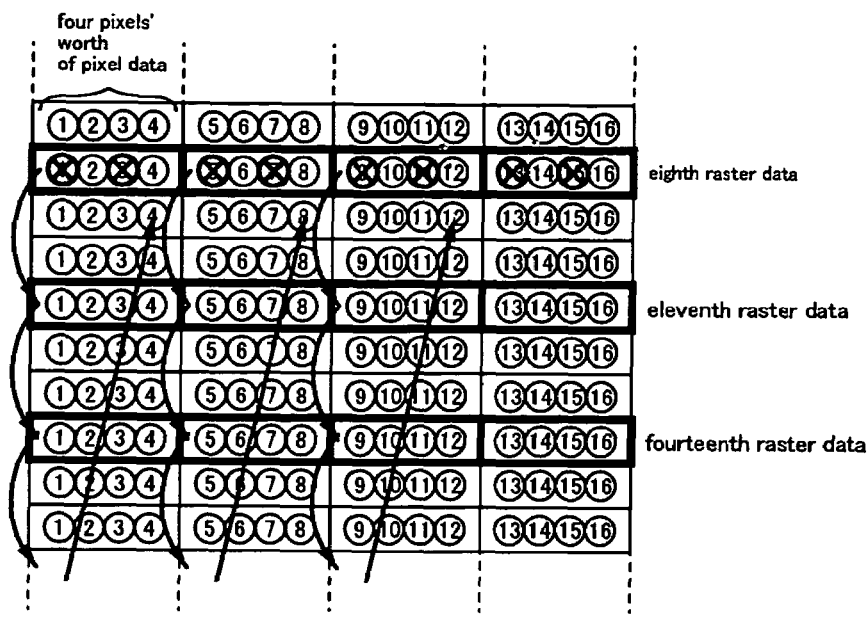
FIG. 35A is an explanatory diagram showing a rasterizing process for creating print data for pass 4.
Figure 35B:
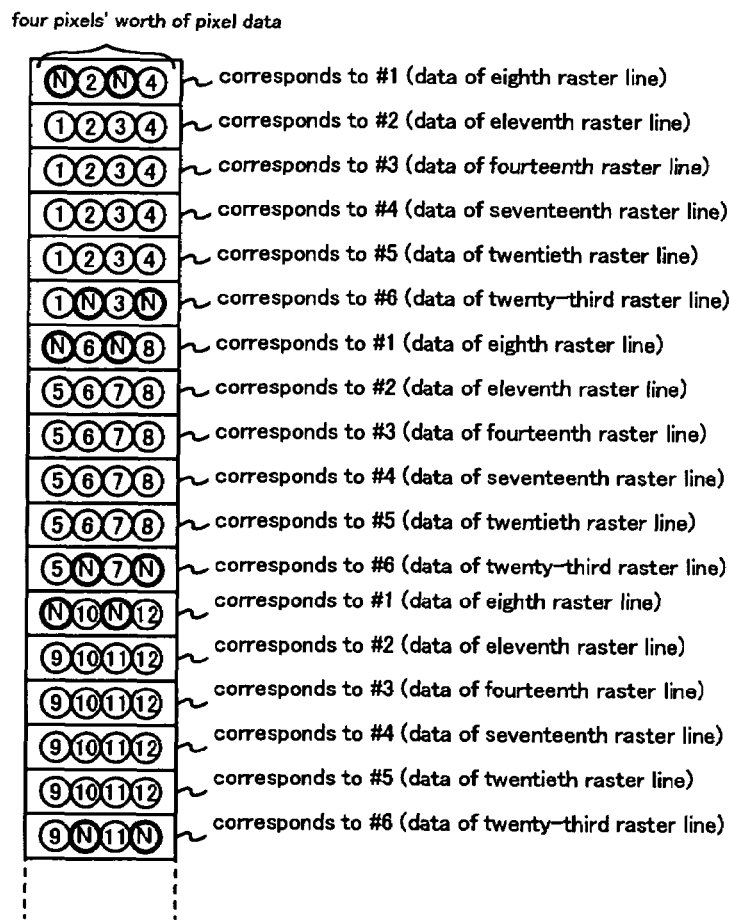
FIG. 35B is an explanatory diagram showing the order of pixel data after rasterization, the order of pixel data being contained in the print data for pass 4.
Figure 36:
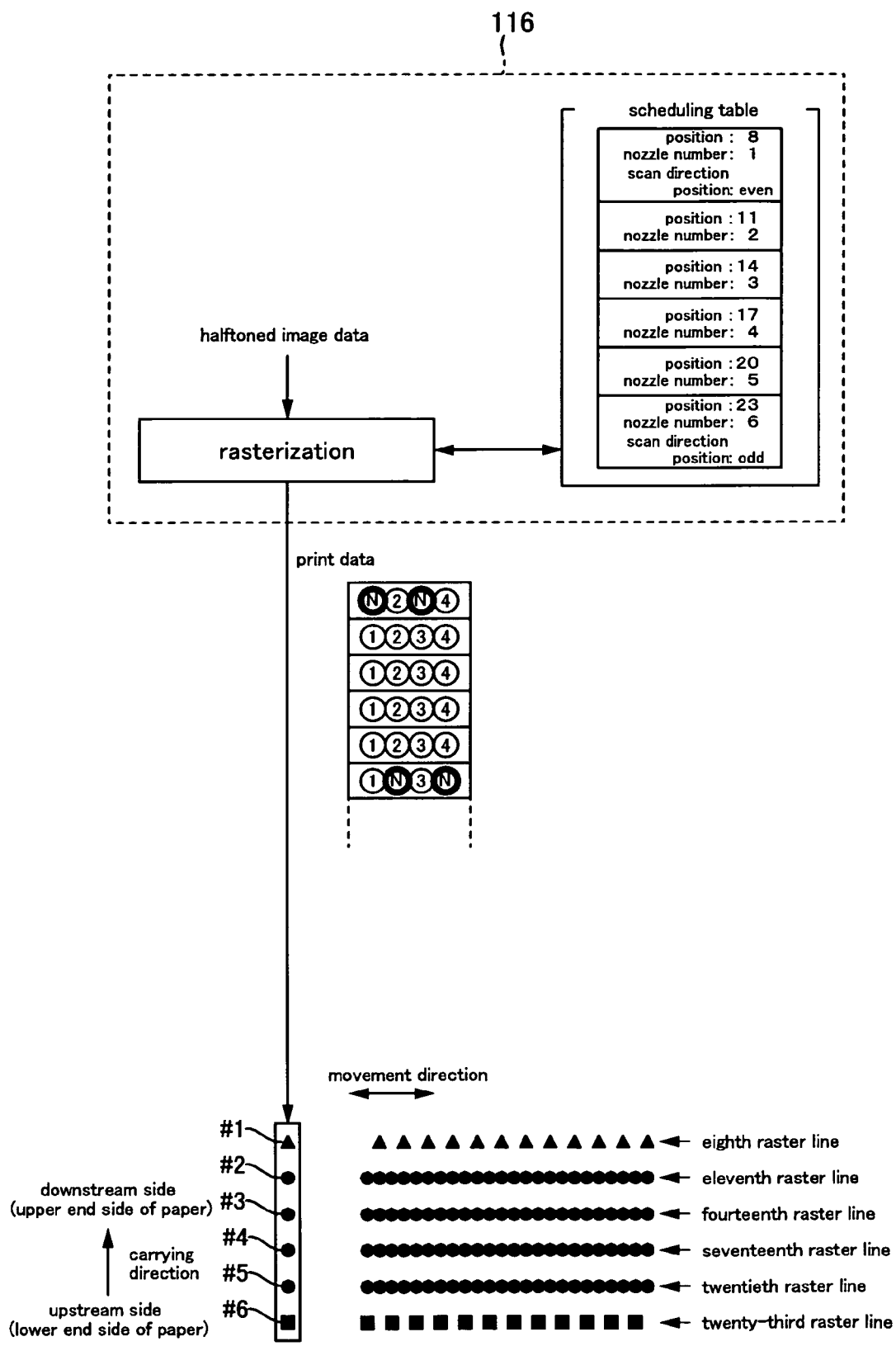
FIG. 36 is a conceptual diagram of a process up until pass 4 is performed.

FIG. 35A is an explanatory diagram showing a rasterizing process for creating print data for pass 4. FIG. 35B is an explanatory diagram showing the order of pixel data after rasterizing, said order of pixel data being contained in the print data for pass 4. FIG. 36 is a conceptual diagram of a process up until pass 4 is performed.

In almost the same way as in the case of the first embodiment, the printer driver rearranges the pixel data in the order shown by the arrow in FIG. 35A, based on the scheduling table (FIG. 32C) for pass 4 of the second embodiment. The pixel data corresponding to the nozzle #1 through the nozzle #6 is thereby extracted from the eighth, eleventh, fourteenth, seventeenth, twentieth, and twenty-third raster data, and the print data is created. The extraction of the pixel data from the raster data is almost the same as in the case of the first embodiment, so the description thereof is omitted.

In the second embodiment, information that "scanning direction position: even numbers" is registered in the scheduling data of "position: 8" in the scheduling table for pass 4. In such a case, the printer driver applies a mask to the odd-numbered pixel data in order only to extract even-numbered pixel data, when extracting the pixel data from the eighth raster data. When creating the print data, the printer driver rewrites the pixel data to which the mask has been applied to NULL data. A mask is thereby applied to the first and third pixel data when extracting the first pixel data from the eighth raster data, and as a result, the first byte of pixel data in the print data contains two bits of NULL data, the second pixel data (two bits), two bits of NULL data, and the fourth pixel data (two bits), in this order (see FIG. 35B).

In the second embodiment, information that "scanning direction position: odd numbers" is registered in the scheduling data of "position: 23" in the scheduling table for pass 4. In such a case, the printer driver applies a mask to the even-numbered pixel data in order only to extract odd-numbered pixel data, when extracting the pixel data from the twenty-third raster data. When creating the print data, the printer driver rewrites the pixel data to which the mask has been applied to NULL data.

When sending to the printer the print data thus created, dots are not formed in pixels which correspond to the NULL data, so during pass 4, the nozzle #1 forms dots intermittently in the even pixels, and the nozzle #6 forms dots intermittently in the odd pixels.

Note that here pass 4 is described, but in other passes, too, if information on the "scanning direction position" is registered in the scheduling table, the same rasterization is performed. The partial overlapped printing of FIG. 27 is achieved by executing each pass in this way.

Other Embodiments

The foregoing embodiment described primarily a printer. However, it goes without saying that the foregoing description also includes the disclosure of printing apparatuses, recording apparatuses, liquid ejection apparatuses, printing methods, recording methods, liquid ejection methods, printing systems, recording systems, computer systems, programs, recording media storing programs, display screens, screen display methods, and methods for producing printed material, for example.

Also, a printer, for example, serving as an embodiment was described above. However, the foregoing embodiment is for the purpose of elucidating the present invention and is not to be interpreted as limiting the present invention. The present invention can of course be altered and improved without departing from the gist thereof and includes functional equivalents. In particular, the embodiments mentioned below are also included in the invention.

<Regarding the Nozzles>

In the foregoing embodiment, ink was ejected using piezoelectric elements. However, the method for ejecting liquid is not limited to this. Other methods, such as a method for generating bubbles in the nozzles through heat, may also be employed.

Overview (1) With the printing system described above, a computer 110 (an example of a print control apparatus) in which a printer driver is installed, and a printer 1 (an example of a printing apparatus) are provided. The printer driver (more accurately, the computer 110 in which the printer driver is installed) creates the print data (FIG. 2, FIG. 24A, and FIG. 24B) by the rasterization (a process of rearranging a plurality pieces of pixel data which make up an image data (see FIG. 23A, FIG. 23B)). The printer 1 alternately repeats a dot-forming process (S003 (see FIG. 5)) based on the print data and a carrying process (S004), thereby forming on a paper S (an example of a medium) a plurality of raster lines (an example of a row of dots) arranged in a carrying direction. Here, the dot-forming process is a process for forming raster lines by ejecting ink from a plurality of nozzles moving in a movement direction, and is also called a "pass." The carrying process is a process for carrying the paper S in the carrying direction with respect to the nozzles.

Incidentally, when performing rasterization, the pixel data needs to be rearranged based on the position in the carrying direction on the paper S of the raster lines formed by the nozzles. Accordingly, in the case of the first reference example and in the case of the present embodiments (the first and second embodiments), the printer driver performs rasterization, referencing the scheduling table.

However, in the case of the first reference example, the positions of the nozzles in all the passes which are repeatedly performed are stored as scheduling tables, so the amount of data of the scheduling tables becomes extremely large. Further, a process for extracting specific data from such a scheduling table takes a long time. Moreover, print data cannot be created until the scheduling table is complete, delaying the start of printing.

Accordingly, in the embodiments described above, the printer driver first stores in a dummy scheduling table (an example of a first table) the positions, on the paper S in the carrying direction, of the raster lines which are to be formed by the nozzles during each pass, assuming that the normal printing is virtually continued even after the predetermined normal printing has finished. For example, the positions, on the paper S in the carrying direction, of the raster lines to be formed by the nozzles in the virtual passes 10' through 12', which are assumed to be performed after pass 9, are recorded in the dummy scheduling table (see S400, S401 to S409 (see FIG. 19), and FIG. 20C). Then the printer driver compares the positions stored in the dummy scheduling table and the positions, on the paper S in the carrying direction, of the raster lines that are to be formed by the nozzles during a pass performing the lower-end printing (S503 (see FIG. 21)), and if there are any matching positions ("Yes" at S504), those positions are stored in the scheduling table (an example of a second table) (see S505 and FIGS. 22A through 22C).

With the present embodiments, scheduling tables can be created for each dot-forming process (each pass) in this way.

As a result, the amount of data of the scheduling tables of the present embodiment (see, for example, FIG. 22A) is smaller compared to the amount of data of the scheduling tables of the first reference example (see, for example, FIG. 12). With the present embodiment, the scheduling table for pass 10, for example, is created directly, so a process for extracting necessary data from a plurality of scheduling data, as in the first reference example (see FIG. 12), is unnecessary, so the time to create scheduling tables for each pass can be reduced. Furthermore, for example, after creating the scheduling table for pass 10, the print data for pass 10 can be created without waiting for the creation of the scheduling tables for other passes, so printing can be started quicker.

(2) In the foregoing embodiments, the printer driver compares the positions stored in the dummy scheduling table with the positions, on the paper S in the carrying direction, of the raster lines that are to be formed by the nozzles during a pass performing the lower-end printing (S503 (see FIG. 21)), and if there are any matching positions ("Yes" at S504), a process for deleting those positions from the dummy scheduling table is performed (S506). For example, at the point immediately after creating the scheduling table for pass 10, five pieces of information, i.e., the positions 38, 41, 44, 47, and 50, are deleted from the dummy scheduling table (see the white circles in the upper diagram of FIG. 22B). That is, although eleven positions are initially stored in the dummy scheduling table (see FIG. 20C and the black circles in the upper diagram of FIG. 22A), only six positions are stored at the point immediately after creating the scheduling table for pass 10 (see the black circles in the upper diagram of FIG. 22B).

When creating the scheduling tables for the following passes, the printer driver uses the dummy scheduling table from which some pieces of position information have been deleted to perform the processes of steps S503 and S504. For example, when creating the scheduling table for pass 11, the printer driver compares the dummy scheduling table storing the remaining six positions and the positions of the nozzles in pass 11 (more specifically, the positions, on the paper S in the carrying direction, of the raster lines to be formed by the nozzles) (S503), and if there are any matching positions ("Yes" at S504), those positions are stored in the scheduling table (S505).

By deleting positions from the dummy scheduling table, it is possible to reduce the load on the computer 110 because the positions targeted for comparison are reduced in number when step S503 is to be performed again. In particular, a significant effect can be attained compared to the above-described model example in cases where the actual number of nozzles is 180 and there are hundreds of raster lines in the lower-end printing region.

(3) Note that with the present embodiments, the number of times the comparing process (S105, etc., and S211, etc.) is performed until scheduling tables for all the passes are created is greater than the first reference example. For this reason, with the present embodiments, the amount of time to create the scheduling tables for all the passes is longer than in the first reference example. However, even if the creation of scheduling tables for later passes (e.g., pass 10, etc.) is slower in the present embodiments than in the first reference example, it is sufficient if the scheduling table for that pass is created and the print data for that pass is created before that pass is performed, so nothing happens such as the completion of printing becoming slower.

Therefore, in the present embodiments, while the printer 1 is performing a certain pass based on the print data (e.g., pass 1), the printer driver creates the print data for the pass to be performed thereafter (e.g., the next pass).

(4) In the second embodiment described above, as a result of performing partial overlapped printing, for example, the nozzle #6 in pass 7 performed during normal printing forms dots in the odd pixels (an example of specific positions in the movement direction), and when performing pass 10 during lower-end printing, the nozzle #1 (an example of an other nozzle) forms dots in the even pixels, such that the spaces between the dots formed in the odd pixels are filled in.

When partial overlapped printing is thus performed, the printer driver compares the position of the POL-bottom nozzle during normal printing with the position stored in the scheduling table (S512 (see FIG. 33)), and if they match ("Yes" at S512), rewrites the scheduling data for that position to that for the POL-top nozzle (S513 (see FIG. 33), see FIG. 34B). The thirty-eighth raster line in FIG. 27, for example, can thus be prevent from being formed twice.

(5) With the second embodiment described above, nozzles which eject ink intermittently in normal printing (e.g., the nozzle #6) are positioned at the ends in the carrying direction of the nozzles which eject ink. This is because nozzles positioned at the ends are prone to faulty ejection. This is not a limitation, however. For example, the nozzles positioned in the central portion of the nozzle group may perform partial overlapped printing by forming dots intermittently.

(6) In the present embodiments described above, the print control apparatus for controlling the printing apparatus was a computer in which a printer driver is installed. In other words, the print control apparatus was provided separately to the printing apparatus.

(7) However, this is not a limitation. For example, the functionality of the printer driver may be provided to the printer 1. The CPU 62 may function as the print control apparatus, controlling a printing apparatus comprising the carrying unit 20, the carriage unit 30, and the heat unit 40. In this case, the print control apparatus and the printing apparatus may be provided as a single unit to the printer 1, the printer 1 thereby being the printing system in a single unit.

What is claimed is:

1. A printing method comprising:
creating print data by rearranging an order in which a plurality of pieces of pixel data which make up image data are arranged; and
based on the print data, alternately repeating
a dot-forming process for forming, on a medium, a row of dots along a movement direction by ejecting ink from a plurality of nozzles which move in the movement direction and
a carrying process for carrying the medium in a carrying direction with respect to the nozzles,
to form, on the medium, a plurality of the rows of dots arranged in the carrying direction,
wherein, in a case where lower-end printing for forming the rows of dots in a lower-end portion of the medium is to be performed after normal printing for forming the rows of dots in a central portion of the medium,
positions, on the medium, of the rows of dots to be formed by the nozzles during each dot-forming process when the normal printing is continued without performing the lower-end printing are stored in a first table,
positions, on the medium, of the rows of dots to be formed by the nozzles during a certain dot-forming process performing the lower-end printing are compared with the positions stored in the first table, and if there is any matching position as a result of the comparison, that position is stored in a second table, and
the pixel data corresponding to the positions stored in the second table are extracted from the image data, to create the print data for performing the certain dot-forming process.

2. A printing method according to claim 1,
wherein a deleting process is performed in which
positions, on the medium, of the rows of dots to be formed by the nozzles during the certain dot-forming process are compared with the positions stored in the first table, and
if there is any matching position as a result of the comparison, that position is deleted from the first table,
wherein positions, on the medium, of the rows of dots to be formed by the nozzles during an other dot-forming process performed after the certain dot-forming process are compared with the positions stored in the first table after the deleting process, and if there is any matching position as a result of the comparison, that position is stored in the second table, and
wherein the pixel data corresponding to the positions stored in the second table are extracted from the image data, to create the print data for performing the other dot-forming process.

3. A printing method according to claim 1,
wherein print data for performing a dot-forming process which is to be performed after the certain dot-forming process is created while the certain dot-forming process is performed based on the print data.

4. A printing method according to claim 1,
wherein, in a case where a certain nozzle forms dots at specific positions in the movement direction during a dot-forming process performing the normal printing and an other nozzle forms dots such as to fill in spaces between the dots formed at the specific positions during the lower-end printing,
a position, on the medium, of the row of dots to be formed by the certain nozzle during the dot-forming process performing the normal printing is compared with the positions stored in the second table, and
if there is any matching position as a result of the comparison, information regarding the specific positions in the movement direction is associated with that position and stored in the second table in association therewith.

5. A printing method according to claim 4,
wherein the certain nozzle is positioned at an end in the carrying direction of the plurality of nozzles.

6. A printing method according to claim 1,
wherein a computer having a printer driver installed thereon creates the print data.

7. A printing method according to claim 1,
wherein a print control apparatus for creating the print data and a printing apparatus for forming, on the medium, a plurality of the rows of dots based on the print data are provided as a single unit.

8. A printing method comprising:
creating print data by rearranging an order in which a plurality of pieces of pixel data which make up image data are arranged; and
based on the print data, alternately repeating
a dot-forming process for forming, on a medium, a row of dots along a movement direction by ejecting ink from a plurality of nozzles which move in the movement direction and
a carrying process for carrying the medium in a carrying direction with respect to the nozzles,
to form, on the medium, a plurality of the rows of dots arranged in the carrying direction,
(A) wherein, in a case where lower-end printing for forming the rows of dots in a lower-end portion of the medium is to be performed after normal printing for forming the rows of dots in a central portion of the medium,
positions, on the medium, of the rows of dots to be formed by the nozzles during each dot-forming process when the normal printing is continued without performing the lower-end printing are stored in a first table,
positions, on the medium, of the rows of dots to be formed by the nozzles during a certain dot-forming process performing the lower-end printing are compared with the positions stored in the first table, and if there is any matching position as a result of the comparison, that position is stored in a second table, and
the pixel data corresponding to the positions stored in the second table are extracted from the image data, to create the print data for performing the certain dot-forming process,
(B) wherein a deleting process is performed in which
positions, on the medium, of the rows of dots to be formed by the nozzles during the certain dot-forming process are compared with the positions stored in the first table, and
if there is any matching position as a result of the comparison, that position is deleted from the first table,
wherein positions, on the medium, of the rows of dots to be formed by the nozzles during an other dot-forming process performed after the certain dot-forming process are compared with the positions stored in the first table after the deleting process, and if there is any matching position as a result of the comparison, that position is stored in the second table, and wherein the pixel data corresponding to the positions stored in the second table are extracted from the image data, to create the print data for performing the other dot-forming process, (C) wherein print data for performing a dot-forming process which is to be performed after the certain dot-forming process is created while the certain dot-forming process is performed based on the print data, (D) wherein, in a case where a certain nozzle forms dots at specific positions in the movement direction during a dot-forming process performing the normal printing and an other nozzle forms dots such as to fill in spaces between the dots formed at the specific positions during the lower-end printing, a position, on the medium, of the row of dots to be formed by the certain nozzle during the dot-forming process performing the normal printing is compared with the positions stored in the second table, and if there is any matching position as a result of the comparison, information regarding the specific positions in the movement direction is associated with that position and stored in the second table in association therewith, (E) wherein the certain nozzle is positioned at an end in the carrying direction of the plurality of nozzles, and (F) wherein a computer having a printer driver installed thereon creates the print data.

9. A printing system comprising:

a print control apparatus for creating print data by rearranging an order in which a plurality of pieces of pixel data which make up image data are arranged; and a printing apparatus that alternately repeats, based on the print data, a dot-forming process for forming, on a medium, a row of dots along a movement direction by ejecting ink from a plurality of nozzles which move in the movement direction and a carrying process for carrying the medium in a carrying direction with respect to the nozzles, to form, on the medium, a plurality of the rows of dots arranged in the carrying direction, wherein, in a case where the printing apparatus is to perform lower-end printing for forming the rows of dots in a lower-end portion of the medium after normal printing for forming the rows of dots in a central portion of the medium, the print control apparatus stores, in a first table, positions, on the medium, of the rows of dots to be formed by the nozzles-during each dot-forming process when the normal printing is continued without performing the lower-end printing, compares positions, on the medium, of the rows of dots to be formed by the nozzles during a certain dot-forming process performing the lower-end printing with the positions stored in the first table, and if there is any matching position as a result of the comparison, stores that position in a second table, and extracts, from the image data, the pixel data corresponding to the positions stored in the second table, to create the print data for performing the certain dot-forming process.

10. A print control apparatus provided with a driver for controlling a printing apparatus, the driver comprising:

a code for creating print data by rearranging an order in which a plurality of pieces of pixel data which make up image data are arranged;

a code for causing the printing apparatus to alternately repeat, based on the print data, a dot-forming process for forming, on a medium, a row of dots along a movement direction by ejecting ink from a plurality of nozzles which move in the movement direction and a carrying process for carrying the medium in a carrying direction with respect to the nozzles, to cause the printing apparatus to form, on the medium, a plurality of the rows of dots arranged in the carrying direction; and a code, for when causing the printing apparatus to perform lower-end printing for forming the rows of dots in a lower-end portion of the medium after normal printing for forming the rows of dots in a central portion of the medium, for storing, in a first table, positions, on the medium, of the rows of dots to be formed by the nozzles during each dot-forming process when the normal printing is continued without performing the lower-end printing, comparing positions, on the medium, of the rows of dots to be formed by the nozzles during a certain dot-forming process performing the lower-end printing with the positions stored in the first table, and if there is any matching position as a result of the comparison, storing that position in a second table, and extracting, from the image data, the pixel data corresponding to the positions stored in the second table, to create the print data for performing the certain dot-forming process.

* * * * *